United States Patent
Zhao et al.

(10) Patent No.: US 10,063,785 B2
(45) Date of Patent: Aug. 28, 2018

(54) COLORIMETRY METHOD, COLORIMETRY DEVICE, SPECTRAL MEASUREMENT METHOD, SPECTRAL MEASUREMENT DEVICE AND ELECTRONIC APPARATUS

(71) Applicant: Seiko Epson Corporation, Tokyo (JP)

(72) Inventors: Danjun Zhao, Shiojiri (JP); Tetsuo Tatsuda, Ina (JP)

(73) Assignee: Seiko Epson Corporation (JP)

( * ) Notice: Subject to any disclaimer, the term of this patent is extended or adjusted under 35 U.S.C. 154(b) by 48 days.

(21) Appl. No.: 14/826,551

(22) Filed: Aug. 14, 2015

(65) Prior Publication Data
US 2016/0057330 A1 Feb. 25, 2016

(30) Foreign Application Priority Data
Aug. 20, 2014 (JP) ................. 2014-167262

(51) Int. Cl.
*H04N 5/235* (2006.01)
*G01J 3/26* (2006.01)
*G01J 3/50* (2006.01)
*G01J 3/12* (2006.01)

(52) U.S. Cl.
CPC .............. *H04N 5/2353* (2013.01); *G01J 3/26* (2013.01); *G01J 3/50* (2013.01); *G01J 2003/1247* (2013.01)

(58) Field of Classification Search
CPC ...... H04N 5/2353; H04N 5/353; H04N 5/374; H04N 5/378; G01J 3/26; G01J 3/50; G01J 3/46; G01J 5/60; G01J 2003/1247
See application file for complete search history.

(56) References Cited

U.S. PATENT DOCUMENTS

| | | | |
|---|---|---|---|
| 5,043,571 A | 8/1991 | Hasegawa | |
| 5,837,574 A | 11/1998 | Bergemont et al. | |
| 6,128,093 A | 10/2000 | Niikura | |

(Continued)

FOREIGN PATENT DOCUMENTS

| | | |
|---|---|---|
| JP | 02-040516 A | 2/1990 |
| JP | 09-224130 A | 8/1997 |

(Continued)

OTHER PUBLICATIONS

Hesterman et al. ("Hardware assessment using the multi-mode, multi-resolution system (M3R): A signal-detection study", Med. Phys. Jul. 2007; 34(7); 3034-3044).

(Continued)

*Primary Examiner* — Luong T Nguyen
(74) *Attorney, Agent, or Firm* — Harness, Dickey & Pierce, P.L.C.

(57) ABSTRACT

An imaging device outputs imaging data captured with a predetermined exposure time, and a brightness determination unit determines whether the brightness of the imaging data is within a predetermined range. Re-imaging is performed with the exposure time changed when the brightness of the imaging data is not within the predetermined range. The re-imaging is performed with the exposure time lengthened when the brightness of the imaging data is less than a determination value, and the re-imaging is performed with the exposure time shortened when the brightness of the imaging data is saturated.

5 Claims, 19 Drawing Sheets

(56) References Cited

U.S. PATENT DOCUMENTS

| | | |
|---|---|---|
| 7,265,828 B2 | 9/2007 | Levine |
| 8,023,004 B2 | 9/2011 | Asoma |
| 8,040,411 B2 | 10/2011 | Nakajima et al. |
| 8,063,976 B2 | 11/2011 | Kita |
| 8,638,374 B2 | 1/2014 | Haneda et al. |
| 9,313,415 B2 * | 4/2016 | Schieltz ............ H04N 5/2353 |
| 2006/0188835 A1 * | 8/2006 | Nagel ................ A61C 19/004 |
| | | 433/29 |
| 2006/0222324 A1 * | 10/2006 | Abe ................ H04N 9/045 |
| | | 386/303 |
| 2007/0132998 A1 | 6/2007 | Tang et al. |
| 2008/0279459 A1 | 11/2008 | Choi et al. |
| 2011/0149071 A1 | 6/2011 | Oggier |
| 2012/0206731 A1 | 8/2012 | Sano et al. |
| 2013/0248602 A1 * | 9/2013 | He ................ G06K 7/10752 |
| | | 235/455 |
| 2014/0125981 A1 * | 5/2014 | Iga ................ G01J 3/26 |
| | | 356/402 |
| 2015/0199559 A1 * | 7/2015 | Sztuk ................ H04N 5/23219 |
| | | 348/78 |

FOREIGN PATENT DOCUMENTS

| | | |
|---|---|---|
| JP | 10-153484 A | 6/1998 |
| JP | 2002-098636 A | 4/2002 |
| JP | 2004-212097 A | 7/2004 |
| JP | 2005-057541 A | 3/2005 |
| JP | 2005-332880 A | 12/2005 |
| JP | 2007-127657 A | 5/2007 |
| JP | 2009-088927 A | 4/2009 |
| JP | 2009-267555 A | 11/2009 |
| JP | 2009-296178 A | 12/2009 |
| JP | 2010-117149 A | 5/2010 |
| JP | 2011-211620 A | 10/2011 |
| JP | 5082648 B2 | 11/2012 |
| JP | 2013-157932 A | 8/2013 |
| JP | 2013-207427 A | 10/2013 |

OTHER PUBLICATIONS

Andor (http://www.andor.com/learning-academy/sensitivity-of-ccd-cameras-key-factors-to-consider.

LSU Mass-Spec (http://web.archive.org/web/20100625163739/http://mass-spec.lsu.edu/msterms/index.php/Dynamic_range) Jun. 25, 2010.

Huang et al. ("Signal-to-noise and radiation exposure considerations in conventional and diffraction x-ray microscopy", Opt. Express Aug. 3, 2009; 17(16): 13541-13553).

* cited by examiner

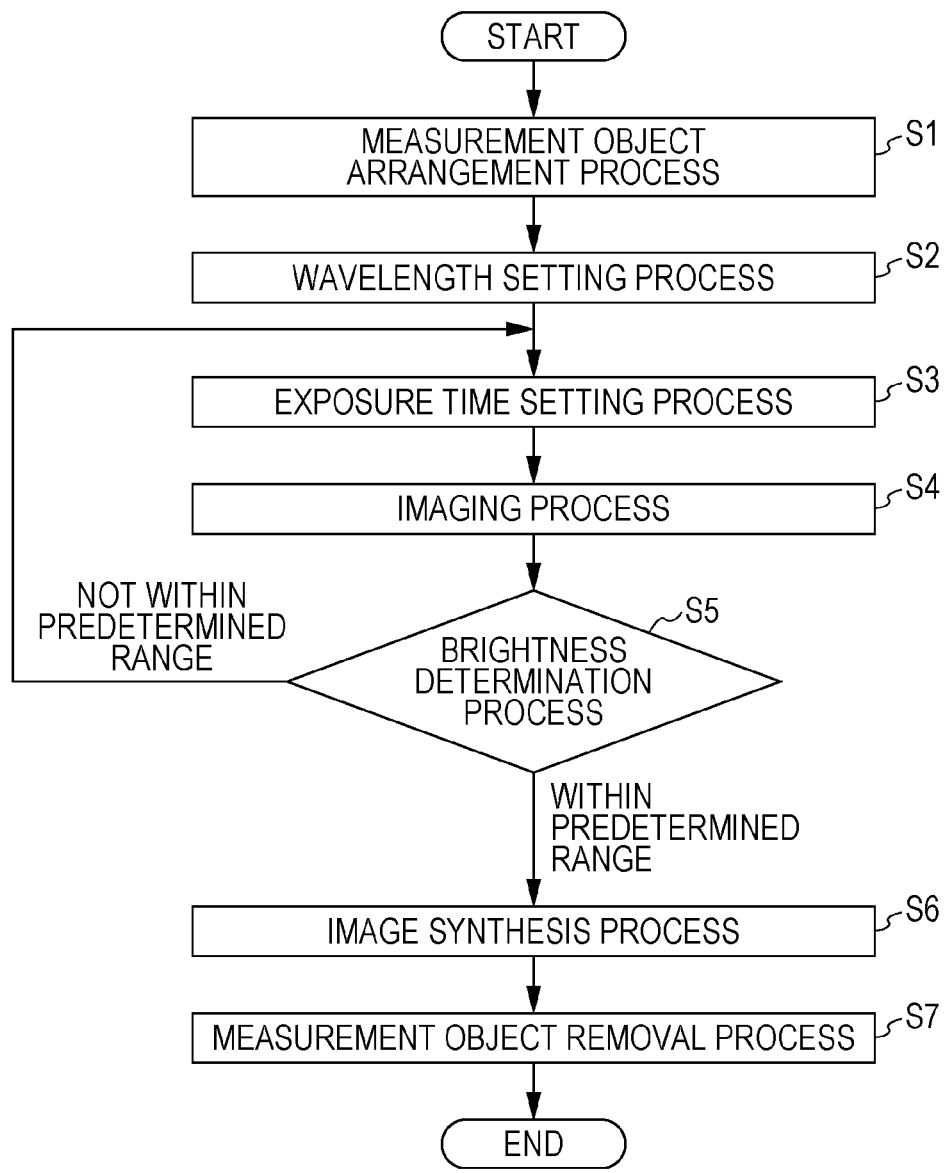

COLORIMETRY METHOD, COLORIMETRY DEVICE, SPECTRAL MEASUREMENT METHOD, SPECTRAL MEASUREMENT DEVICE AND ELECTRONIC APPARATUS

BACKGROUND

1. Technical Field

The present invention relates to a colorimetry method, colorimetry device, a spectral measurement method, a spectral measurement device and electronic apparatus.

2. Related Art

In the related art, a variable spectrum device is known in which the gap between opposed mirrors is varied, and light with a predetermined wavelength is allowed to pass through the variable spectrum device. The variable spectrum device is also referred to as an etalon device. The variable spectrum device is able to vary the gap between mirrors with a piezoelectric element or electrostatic actuator. It is possible for light with a specific wavelength distribution to be imaged when combining the variable spectrum device and an imaging device. It is possible for a distribution of color reflected by a measurement object to be measured when performing imaging while changing the wavelength of light to be spectrally diffracted by the variable spectrum device.

Solid-state imaging elements in which phototransistors are two-dimensionally arranged are widely used as imaging devices. The phototransistors in the solid-state imaging element convert the light to a current signal and store the current in a capacitor. It is possible for the distribution of light to be output as a voltage signal by outputting the voltage of the capacitor. The imaging device has a limited dynamic range indicating the width of brightness of the image imaged. It is possible to image bright locations and dark locations by controlling the exposure time for which light is input into the solid-state imaging element.

JP-A-2011-211620 discloses a method of widening the dynamic range of the imaging device. According to the method, the imaging device is capable of two exposures of a long term exposure in which the exposure time is long and a short term exposure in which the exposure time is short. Imaging is performed by alternating the long-term exposure and the short-term exposure. Next, an image imaged with the long-term exposure and an image imaged with the short term exposure are synthesized.

Imaging is performed at a plurality of wavelengths when measuring the distribution of color of the measurement object. Because the measurement object forms a bright image or a dark image depending on the color, there is a need to widen the dynamic range of the imaging device. At this time, since imaging is performed with the long term exposure and the short term exposure for the measurement of one color, the time for measurement is lengthened. Here, there is demand for a colorimetry method able to maintain the width of brightness detected, thereby shortening the time for colorimetry.

SUMMARY

The invention can be realized in the following forms or application examples.

Application Example 1

According to this application example, there is provided a colorimetry method including outputting imaging data captured with a predetermined exposure time, determining whether the brightness of the imaging data is within a predetermined range, and performing re-imaging with the exposure time changed when the brightness of the imaging data is not within the predetermined range.

In this case, imaging is performed with the predetermined exposure time, and imaging data is output. Then, whether the brightness of the imaging data is within a predetermined range is determined. Re-imaging is performed with the exposure time changed when the brightness of the imaging data is not within the predetermined range. The imaging data is utilized without performing the re-imaging when the brightness of the imaging data is within the predetermined range.

There are times when the brightness of the imaging data is excessively low, or excessively high to be saturated. As a counter measure, there are methods of utilizing the imaging data having the brightness within the predetermined range after imaging with a plurality of exposure times. Unlike these methods, in the application example, re-imaging is performed only when necessary after determining the imaging data. Accordingly, the number of imagings can be reduced, and thus colorimetry can be performed in a short time. As a result, the width of the brightness is maintained, thereby shortening the time for colorimetry.

Application Example 2

In the colorimetry method according to the application example, the re-imaging is performed with the exposure time lengthened when the brightness of the imaging data is less than a determination value, and the re-imaging is performed with the exposure time shortened when the brightness of the imaging data is saturated.

In this case, the re-imaging is performed with the exposure time lengthened when the brightness of the imaging data is less than a determination value. In so doing, imaging can be performed while raising the brightness in locations where the brightness of the imaging data is low. The width of the brightness can be widened. The re-imaging is performed with the exposure time shortened when the brightness of the imaging data is saturated. The brightness can be measured at locations where the brightness is unclear due to the brightness of the imaging data being excessively high and exceeding the range of brightness able to be imaged. Accordingly, even at locations where the brightness is low or at locations where the brightness is high, the width of the brightness can be widened.

Application Example 3

In the colorimetry method according to the application example, the exposure time during the re-imaging is stored, and imaging after the re-imaging is performed with the stored exposure time.

In this case, the exposure time during re-imaging is stored. Imaging after the re-imaging is performed with the stored exposure time. Accordingly, the opportunities for re-imaging when continuously measuring similar measurement objects can be reduced. As a result, the time for colorimetry can be shortened.

Application Example 4

In the colorimetry method according to the application example, imaging after the re-imaging is performed with the exposure time set.

In this case, imaging after the re-imaging is performed with the exposure time set. An operator sets an exposure time that matches the measurement object with reference to the exposure time during the re-imaging. Accordingly, the opportunities for re-imaging can be reduced, and thus the time for colorimetry can be shortened.

Application Example 5

In the colorimetry method according to the application example, the imaging data is two-dimensional data having a plurality of rows, determination is performed on whether the brightness of one row of the imaging data is within the predetermined range when determining the brightness of the imaging data, and re-imaging of one row is performed with the exposure time changed when the brightness of the imaging data is not within the predetermined range.

In this case, the imaging data is two-dimensional data having a plurality of rows. Whether the maximum value of the brightness of one row of the imaging data is within the predetermined range is determined. One row is re-imaged with the exposure time changed when re-imaging is necessary. Compared to imaging one screen, the time needed for imaging of one row is short. Accordingly, compared to when imaging, determination, and re-imaging are performed for each screen, the time for colorimetry can be shortened when performing imaging, determination, and re-imaging for each line.

Application Example 6

In the colorimetry method according to the application example, the exposure time during the re-imaging is stored, and imaging of a row next to a re-imaged row is performed with the stored exposure time.

In this case, the exposure time of the re-imaged row is stored. Imaging of the next row is performed with the stored exposure time. Accordingly, the opportunities for re-imaging when measuring the measurement object with a form in which the brightness of the next row is similar in the imaging data to be captured can be reduced. As a result, the time for colorimetry can be shortened.

Application Example 7

According to this application example, there is provided a colorimetry method including outputting imaging data captured with a predetermined exposure time, determining whether the brightness of the imaging data is within a predetermined range, and performing continuous imaging by extending the exposure time when the brightness of the imaging data is less than a determination value.

In this case, continuous imaging is performed extending the exposure time when the brightness of the imaging data is less than a determination value. Accordingly, the time taken for exposure can be shortened compared to when the re-imaging is performed. As a result, the time for colorimetry can be shortened.

Application Example 8

According to this application example, there is provided a colorimetry device, including a light filter that allows light with a predetermined wavelength to pass therethrough, an imaging unit that captures imaging data by receiving the light and outputs the imaging data, a determination unit that determines whether the brightness of the imaging data is within a predetermined range, and a controller that performs re-imaging with the exposure time changed when the brightness of the imaging data is not within the predetermined range.

In this case, the light filter allows light with a predetermined wavelength to pass therethrough. The imaging data captured by the imaging unit receiving light is output. Next, the determination unit determines whether the brightness of the imaging data is within the predetermined range. Re-imaging is performed by the controller changing the exposure time when the brightness of the imaging data is not within the predetermined range.

There are times when the brightness of the imaging data is excessively low, or excessively high to be saturated. As a counter measure, there are methods of utilizing the imaging data having the brightness within the predetermined range after the imaging unit performs imaging with a plurality of exposure times. Unlike these methods, in the application example, the controller performs the re-imaging only when necessary after the determination unit determines the imaging data. Accordingly, the number of imagings can be reduced, and thus colorimetry can be performed in a short time. As a result, the width of the brightness can be maintained, thereby shortening the time for colorimetry.

Application Example 9

In the colorimetry device according to the application example, the imaging data is two-dimensional data having a plurality of rows, the determination unit determines whether the brightness of one row of the imaging data is within the predetermined range, and the controller re-images one row with the exposure time changed when the brightness of the imaging data is not within the predetermined range.

In this case, the imaging data is two-dimensional data having a plurality of rows. The determination unit determines whether the maximum value of the brightness of one row of the imaging data is within the predetermined range. The controller re-images one row with the exposure time changed when the maximum value of brightness of the imaging data is not within the predetermined range. Compared to imaging one screen, the time needed for imaging of one row is short. Accordingly, compared to when imaging and re-imaging are performed for each screen, the time for colorimetry can be shortened when performing imaging and re-imaging for each line.

Application Example 10

The colorimetry device according to the application example further includes a storage unit that stores the exposure time during the re-imaging, and in the colorimetry device, a next imaging is performed with the stored exposure time.

In this case, the storage unit stores the exposure time during re-imaging. The next imaging is performed with the stored exposure time. Accordingly, the opportunities for re-imaging when continuously measuring similar measurement objects can be reduced. As a result, the time for colorimetry can be shortened.

Application Example 11

According to this application example, there is provided a colorimetry device, including a light filter that allows light with a predetermined wavelength to pass therethrough, an imaging unit that captures imaging data by receiving the light and outputs the imaging data, a determination unit that determines whether the brightness of the imaging data is a predetermined determination value or less, and a controller that performs continuous imaging by changing the exposure time to be extended when the brightness of the imaging data is the predetermined determination value or less.

In this case, the light filter allows light with a predetermined wavelength to pass therethrough. The imaging data captured by the imaging unit receiving light is output. Next, the determination unit determines whether the brightness of the imaging data is a predetermined determination value or less. The controller performs continuous imaging by extending the exposure time when the brightness of the imaging data is the predetermined determination value or less.

The controller performs continuous imaging by extending the exposure time when the brightness of the imaging data is the determination value or less. Accordingly, the time taken for exposure can be shortened compared to when re-imaging is performed. As a result, the time for colorimetry can be shortened.

Application Example 12

According to this application example, there is provided an electronic apparatus including a colorimetry device, and a controller that controls the colorimetry device, in which the colorimetry device is the colorimetry device described above.

In this case, the electronic apparatus is provided with a colorimetry device, and a controller that controls the colorimetry device. The colorimetry device described above is used as the colorimetry device. The colorimetry device is a device able to maintain the width of the brightness, thereby shortening the time for colorimetry. Accordingly, the electronic apparatus can be a device provided with a colorimetry device able to maintain the width of the brightness, thereby shortening the time for colorimetry.

BRIEF DESCRIPTION OF THE DRAWINGS

The invention will be described with reference to the accompanying drawings, wherein like numbers reference like elements.

FIG. 4 is a flowchart of a colorimetry method.

DESCRIPTION OF EXEMPLARY EMBODIMENTS

In the embodiment, characteristic examples of the colorimetry device and the colorimetry method that measures the wavelength of reflection light of the measurement object using the colorimetry device are described with reference to the drawings. Below, embodiments are described with reference to the drawings. In order to be a recognizable size in each of the drawings, each member in the respective drawings is depicted by the scales being made different for each member.

First Embodiment

Figure 1:
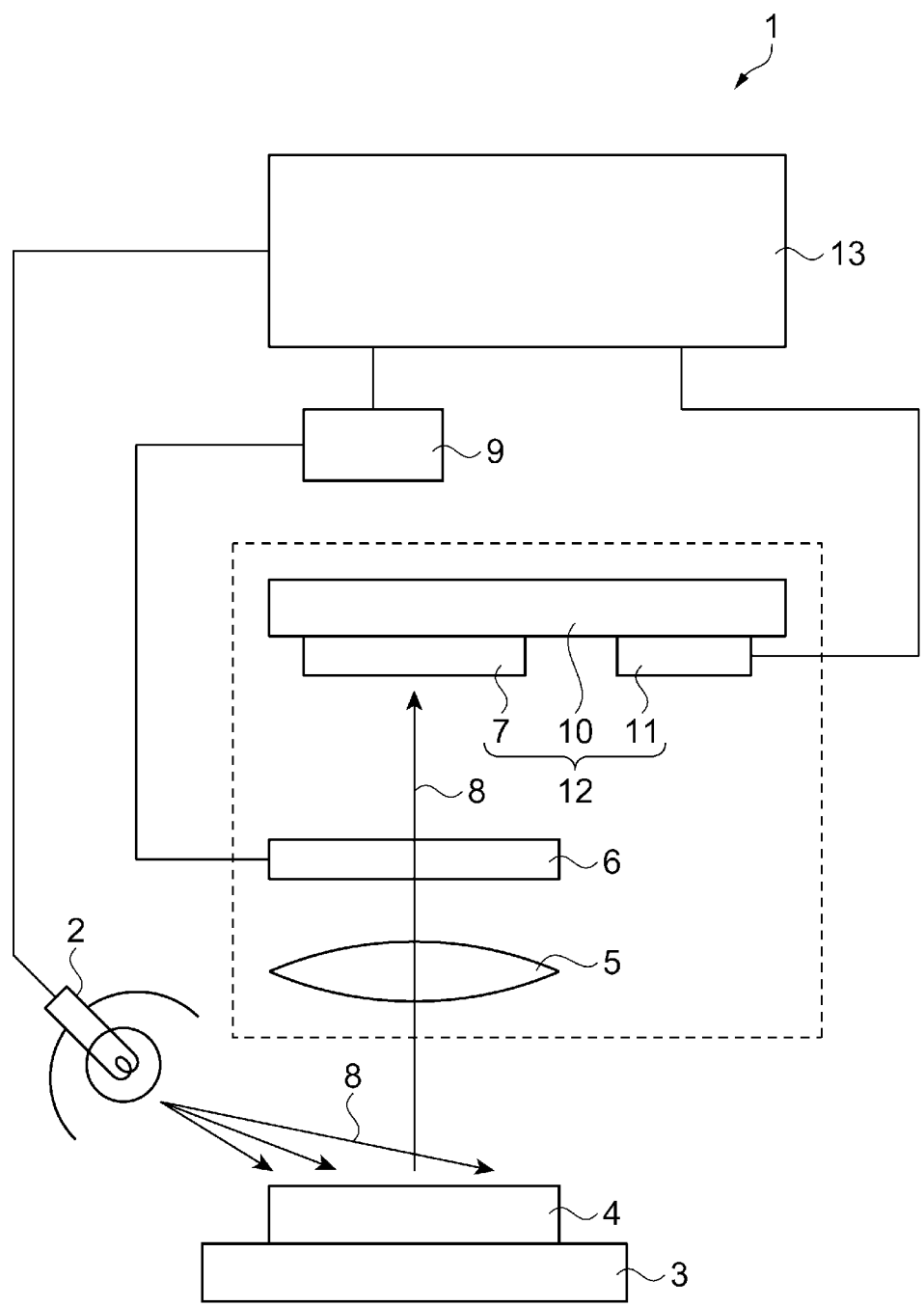
FIG. 1 is a block diagram showing a configuration of a colorimetry device according to a first embodiment.

The colorimetry device and the colorimetry method according to the first embodiment are described with reference to FIGS. 1 to 11. FIG. 1 is a block diagram showing a configuration of the colorimetry device. The colorimetry device 1 includes a light source 2, as shown in FIG. 1. The light source 2 radiates a reference light such as white light. The light source 2 is constructed by combining an incandescent lamp and a light filter. In addition, adjustment may be performed so that the light radiated has a predetermined wavelength distribution by combining a plurality of colors of light emitting diodes (LED).

A mounting stand 3 is arranged at a location facing the light source 2 and a measurement object 4 is mounted on the mounting stand 3. An imaging lens 5 is arranged at a location facing the measurement object 4. A light filter 6 and a light receiving element array 7 are arranged lined up in this order on the optical axis of the imaging lens 5. Light 8 radiated from the light source 2 passes through the imaging lens 5 and the light filter 6, thereby irradiating the light receiving element array 7. The imaging lens 5 and the light receiving element array 7 are arranged so that an image of the measurement object 4 is formed on the light receiving element array 7 by the imaging lens 5.

The light filter 6 is a variable light interference filter, and is an optical element that allows a specified wavelength to pass therethrough. Accordingly, an image of the reflection light with the specified wavelength is projected to the light receiving element array 7. The light filter 6 is connected to a filter driving device 9. The filter driving device 9 drives the light filter 6, thereby controlling the wavelength of light 8 allowed to pass through light filter 6.

The light receiving element array 7 is a two-dimensional imaging element plate on which photodiodes that convert light to an electrical signal are arranged in a matrix-shape.

It is possible for a charge coupled device (CCD) image sensor, complementary metal oxide semiconductor (CMOS) image sensor, and a charge modulation device (CMD) to be used in the light receiving element array 7. Although not particularly limited, CCD image sensors are used in the embodiment. The light receiving element array 7 converts the intensity of the received light 8 to a voltage. A driving circuit 11 converts the converted voltage to digital data, and outputs the results. In the embodiment, for example, the brightness is converted to digital data with 1024 gradations.

The light receiving element array 7 is arranged on a circuit substrate 10. A driving circuit 11 that drives the light receiving element array 7 is arranged on the circuit substrate 10. An imaging device 12 as an imaging unit is configured by the light receiving element array 7, circuit substrate 10, driving circuit 11, and the like. The light source 2, filter driving device 9, and imaging device are connected to a control device 13, and the control device 13 controls the light source 2, light filter 6, and the imaging device 12.

Figure 2:
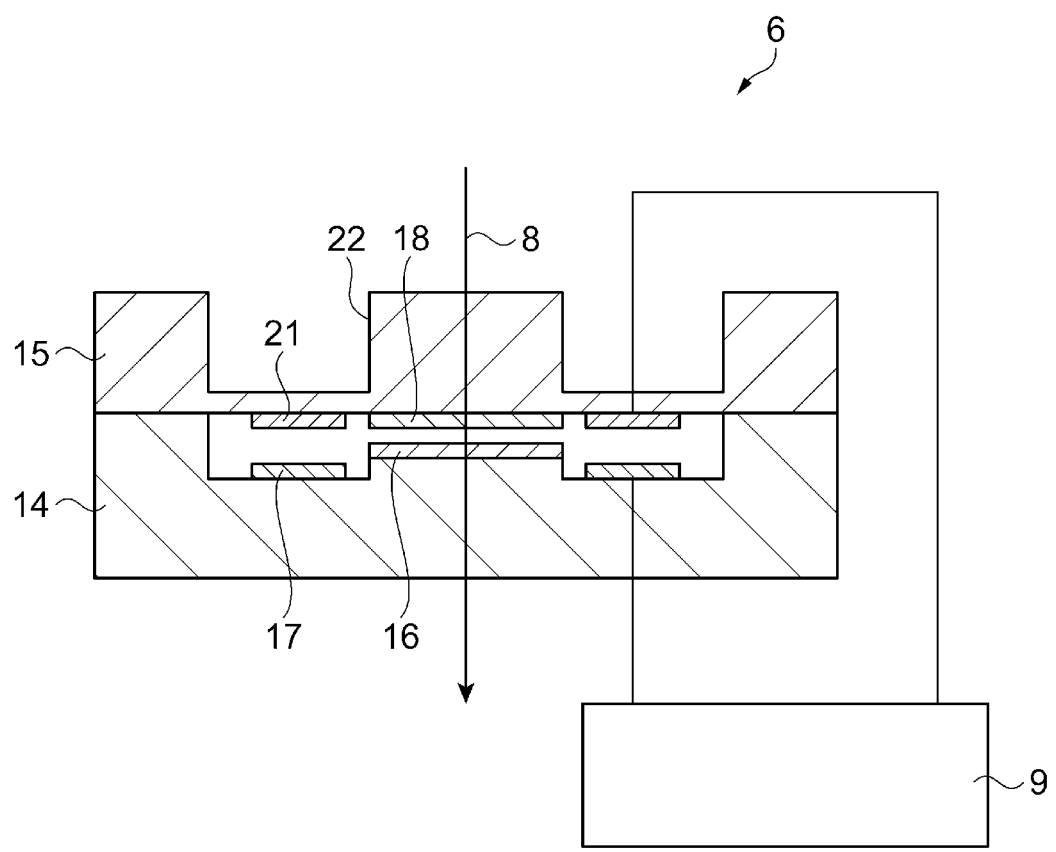
FIG. 2 is a schematic side cross-sectional view showing a structure of a light filter.

FIG. 2 is a schematic side cross-sectional view showing the structure of the light filter. As shown in FIG. 2, the light filter 6 has a structure in which a fixed substrate 14 and a movable substrate 15 are bonded. A circular first reflection film 16 is arranged in the center of the fixed substrate 14. An annular first electrode 17 is arranged on the periphery of the first reflection film 16, and the first electrode 17 surrounds the first reflection film 16.

A second reflection film 18 is arranged on a surface of the movable substrate 15 facing the first reflection film 16. The light 8 is repeatedly reflected between the first reflection film 16 and the second reflection film 18, thereby causing interference. The light 8 corresponding to the distance between the first reflection film 16 and the second reflection film 18 passes through the light filter 6.

On the movable substrate 15, an annular second electrode 21 is arranged at a location facing the first electrode 17 on the periphery of the second reflection film 18. The first electrode 17 and the second electrode 21 are connected to the filter driving device 9. The filter driving device 9 applies a voltage between the first electrode 17 and the second electrode 21. In so doing, an electrostatic force acts between the first electrode 17 and the second electrode 21.

An annular groove 22 is formed in the movable substrate 15. The movable substrate 15 is thinned by the groove 22. In the movable substrate 15, the second reflection film 18 moves easily in the travelling direction of the light 8. When static electricity is stored between the first electrode 17 and the second electrode 21, an attractive force or a repulsive force acts between the first electrode 17 and the second electrode 21. In so doing, the filter driving device 9 is able to control the distance between the first reflection film 16 and the second reflection film 18.

Figure 3:
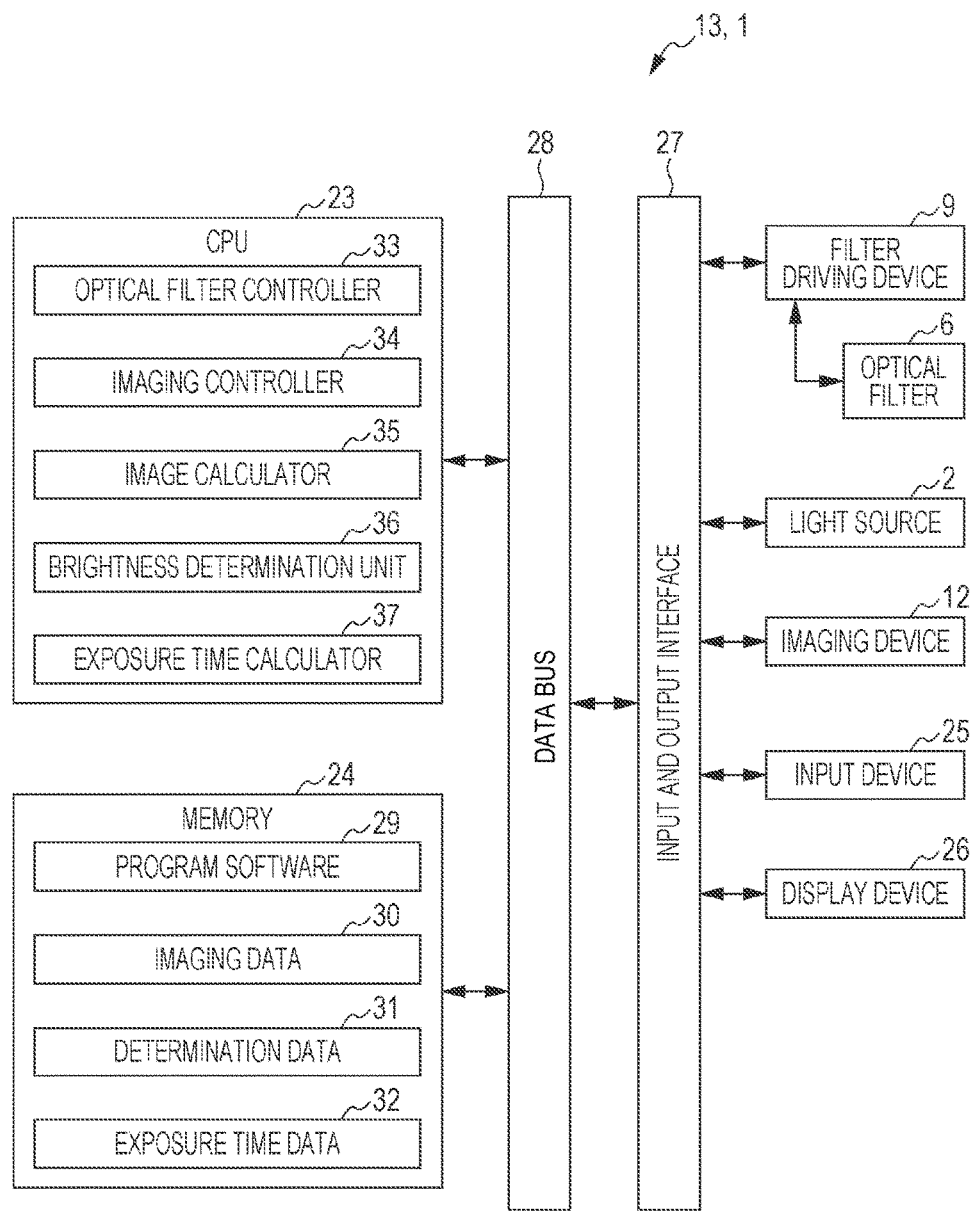
FIG. 3 is an electrical control block diagram of the colorimetry device.

FIG. 3 is an electrical control block diagram of the colorimetry device. As shown in FIG. 3, the control device 13 of the colorimetry device 1 includes a central processing unit (CPU) 23 that performs various calculation processes as a processor, and a memory 24 as a storage unit that stores a variety of information.

The filter driving device 9, the imaging device 12, the light source 2, an input device 25, and a display device are connected to the CPU 23 via an input and output interface 27 and a data bus 28.

The input device 25 includes an interface that inputs a variety of setting information from an external device in addition to a plurality of switches, such as a keyboard. Data and the like used for driving the colorimetry device 1 can be input to the colorimetry device via the input device 25. A user is able to perform various settings by operating the input device 25. The display device 26 is a component that displays information such as measured color data or imaged images. It is possible for a liquid crystal display device or an organic electro-luminescence (EL) device to be used as the display device 26.

The conception of the memory 24 includes semiconductor memories such as a RAM or a ROM, externally attached hard disks, and external storage devices such as a CD-ROM. Functionally, a storage region is set that stores program software 29, in which the control procedures of the operation in the colorimetry device 1 are written. A storage region for storing imaging data 30 that is data of images or the like imaged by the imaging device 12 is also set. Additionally, a storage region is set for storing determination data 31 that is data of a determination value or the like used when the CPU 23 performs determination.

Additionally, a storage region is set for storing exposure time data 32 that is data of the exposure time for which the photodiodes receive light when the imaging device 12 performs imaging. A storage region that functions as a work area or temporary file or the like for the CPU 23 or various other storage regions is set.

The CPU 23 performs control for detecting the color of the measurement object 4 using data output by the imaging device 12 according to the program software 29 stored in the memory 24. The CPU 23 as a specific function realizing unit includes a light filter controller 33 that designates the wavelength of light 8 that passes through the light filter 6, and instructs the filter driving device 9 to drive the light filter 6. An imaging controller 34 is further included as a controller that instructs the imaging device 12 to start or finish imaging and designates imaging conditions. An image calculator 35 is further included that performs synthesis of images imaged by the imaging device 12.

The CPU 23 includes a brightness determination unit as a determination unit that performs determination on whether a location at which the brightness is saturated is present in the image imaged by the imaging device 12. The brightness determination unit 36 performs determination on whether the brightness of the brightest location of the image imaged by the imaging device 12 is higher than the determination value. The CPU 23 further includes an exposure time calculator 37 as a controller that calculates the exposure time set by the light filter controller 33.

Next, the colorimetry method of imaging an image with a specified wavelength emitted by the measurement object 4 using the colorimetry device 1 is described with FIGS. 4 to 11. FIG. 4 is a flowchart of the colorimetry method, and FIGS. 5 to 11 are schematic diagrams for describing the colorimetry method.

In the flowchart in FIG. 4, the step S1 corresponds to a measurement object arrangement process, and is a process of arranging the measurement object 4 on the mounting stand 3. Next, the process proceeds to the step S2. The step S2 corresponds to a wavelength setting process. This process is a process for setting the wavelength of light 8 that passes through the light filter 6. Next, the process proceeds to the step S3. The step S3 corresponds to an exposure time setting process, and is a process for setting the time for which the light receiving element array is exposed to light when the imaging device 12 performs imaging. Next, the process proceeds to the step S4.

The step S4 corresponds to an imaging step. The process is a process in which the imaging device 12 images the measurement object 4 through the light filter 6. Next, the process proceeds to the step S5. The step S5 corresponds to the brightness determination step. The process is a process for determining the brightness of the imaged image. When the brightness of the image is within the predetermined range, the process proceeds to the step S6. When the brightness of the image is saturated, the process proceeds to the step S3. Additionally, when the brightness of the image is smaller than the determination value, the process proceeds to the step S3. The determination value is within the predetermined range. For example, the determination value is a minimum value of the predetermined range.

The step S6 corresponds to an image synthesis process. The process is a process for synthesizing a plurality of images into one image when images with different exposure times are imaged. When there are no images to be synthesized, no processing is performed. Next, the process proceeds to the step S7. The step S7 corresponds to a measurement object removal process. The process is a process for removing the measurement object 4 from the mounting stand 3. The process of performing colorimetry on the measurement object 4 through the above processes is finished. When the same measurement object 4 is measured while changing the color to be measured, the process starts from the step S2.

Next, the colorimetry method corresponding to the steps shown in FIG. 4 is described in detail using FIGS. 1 to 3 and FIGS. 5A to 11.

In the steps S1, the measurement object 4 is arranged on the mounting stand 3 as shown in FIG. 1. A clamp device, not shown, that fixes the measurement object 4 is arranged on the mounting stand 3. The operator fixes the measurement object 4 to the mounting stand 3 using the clamp device so that the measurement object 4 does not move.

In the step S2, the light filter controller 33 instructs the filter driving device 9 on the wavelength of the light 8 that passes through the light filter 6. As shown in FIG. 2, the filter driving device 9 is connected to the first electrode 17 and the second electrode 21. The filter driving device 9 controls the voltage between the first electrode 17 and the second electrode 21. The distance between the first reflection film 16 and the second reflection film 18 is set to a distance corresponding to the wavelength of light 8 that passes through the light filter 6.

Figure 5A:
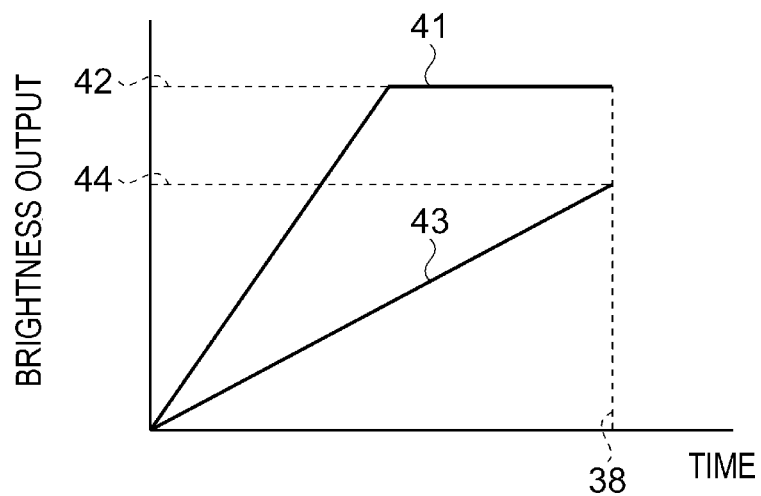
FIGS. 5A and 5B are schematic diagrams for describing the colorimetry method.

FIGS. 5A to 6B are diagrams corresponding to the exposure time setting process in the step S3, the imaging process in the step S4, and the brightness determination process in the step S5. In FIG. 5A, the horizontal axis indicates the passage of time after the imaging device 12 starts imaging. The vertical axis indicates the brightness output of the pixel at a given position in the imaged image. The upper side in the drawing shows a greater output than the lower side. The light receiving element array 7 converts the intensity of the light to a voltage, and the driving circuit 11 converts the voltage to digital data with 1024 gradations. Accordingly, the vertical axis indicates the value of the digital data that indicates the brightness. In the step S3, the exposure time calculator 37 sets the exposure time to a first exposure time 38. The first exposure time 38 is the initial value of the exposure time, and is preferably set to an appropriate value by performing testing in the past.

In the step S4, the imaging device 12 performs imaging, and outputs the imaging data. A first brightness transition line 41 shows an example of a transition of the brightness of the image in which a bright location of the measurement object 4 is imaged. In the first brightness transition line 41, the brightness output rises from the start of imaging and is saturated before reaching the first exposure time 38. The wording "is saturated" indicates that the brightness output of the imaging device 12 reaches the 1024th gradation that is the maximum capacity. The brightness output when saturated is referred to as a saturation output 42.

A second brightness transition line 43 shows an example of the transition of the brightness of the image corresponding to a location at which the measurement object 4 is moderately bright. In the second brightness transition line 43, a second brightness output 44 that is the brightness output when the first exposure time 38 passes does not reach the saturation output 42. The second brightness output 44 at this time is appropriately detected.

Figure 5B:
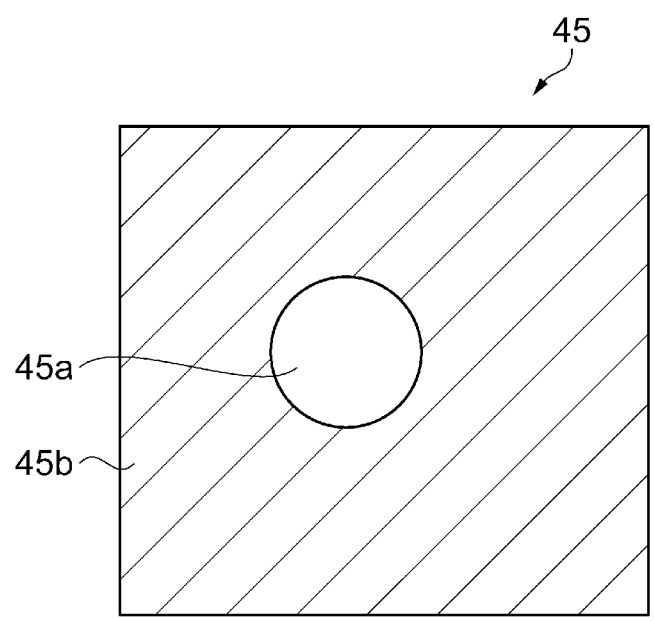

FIG. 5B shows a first image 45 output by the imaging device 12. A first region 45a in the first image 45 is a region indicated by the first brightness transition line 41, and is a location where the brightness output becomes the saturation output 42. A second region 45b is a region indicated by the second brightness transition line 43, and is a location at which the brightness output becomes the second brightness output 44. As shown in the drawings, the process proceeds to the step S3 in a case where a portion of the first image 45 becomes the first region 45a and a case where the entirety of the first image 45 becomes the first region 45a.

Figure 6A:
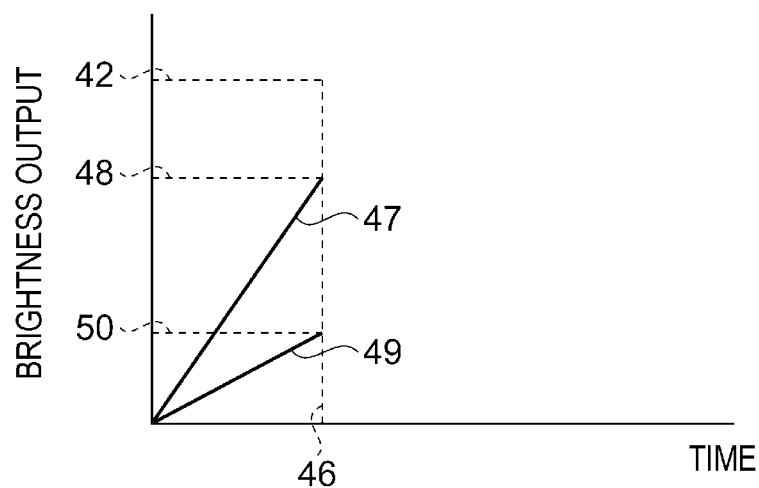
FIGS. 6A and 6B are schematic diagrams for describing the colorimetry method.

The vertical and horizontal axes in FIG. 6A are the same as FIG. 5A, and description thereof will not be made. In the step S3, the exposure time calculator 37 sets the exposure time to a second exposure time 46 as the exposure time. The second exposure time 46 is shorter than the first exposure time 38. Although the second exposure time 46 is not particularly limited, in the embodiment, for example, the second exposure time 46 is set to ⅓ of the first exposure time 38. Next, in the step S4, the imaging device 12 re-images the measurement object 4.

A third brightness transition line 47 shows an example of the transition of the brightness of the image corresponding to a location at which the measurement object is bright. In the re-imaging, the exposure time is shortened. In so doing, in the third brightness transition line 47, a third brightness output 48 that is the brightness output when the second exposure time 46 passes does not reach the saturation output 42. Since the exposure time and the brightness output are in direct proportion, it is possible for the brightness output to be lowered with the exposure time shortened. The third brightness output 48 at this time is appropriately detected.

A fourth brightness transition line 49 shows an example of the transition of the brightness of the image corresponding to a location at which the measurement object 4 is moderately bright. In the fourth brightness transition line 49, a fourth brightness output 50 that is the brightness output when the second exposure time 46 passes does not reach the saturation output 42. The fourth brightness output 50 at this time is appropriately detected.

Figure 6B:
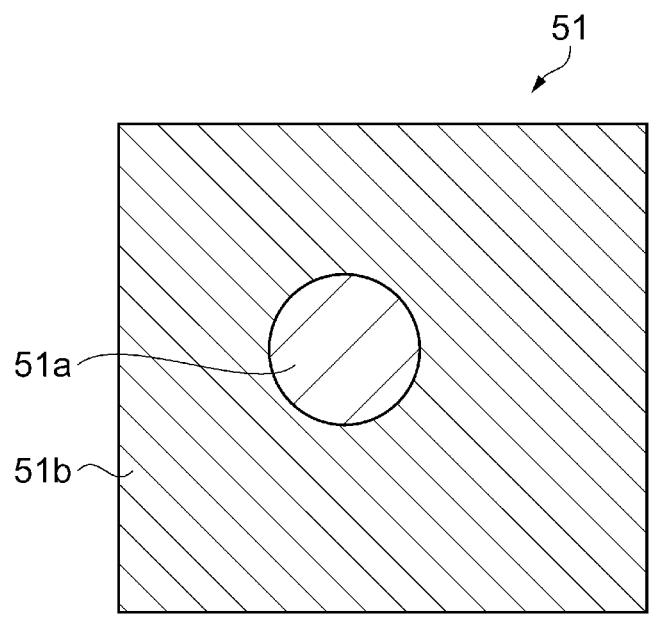

FIG. 6B shows a second image 51 re-imaged and output by the imaging device 12. The second image 51 is imaged with a shorter exposure time than the first image 45. A first region 51a in the second image 51 is a region indicated by the third brightness transition line 47, and is a location where the brightness output becomes the third brightness output 48. A second region 51b is a region indicated by the fourth brightness transition line 49, and is a location at which the brightness output becomes the fourth brightness output 50. As shown in the drawings, since the brightness output in the second image 51 does not reach the saturation output 42, the process proceeds to the step S6.

Figure 7A:
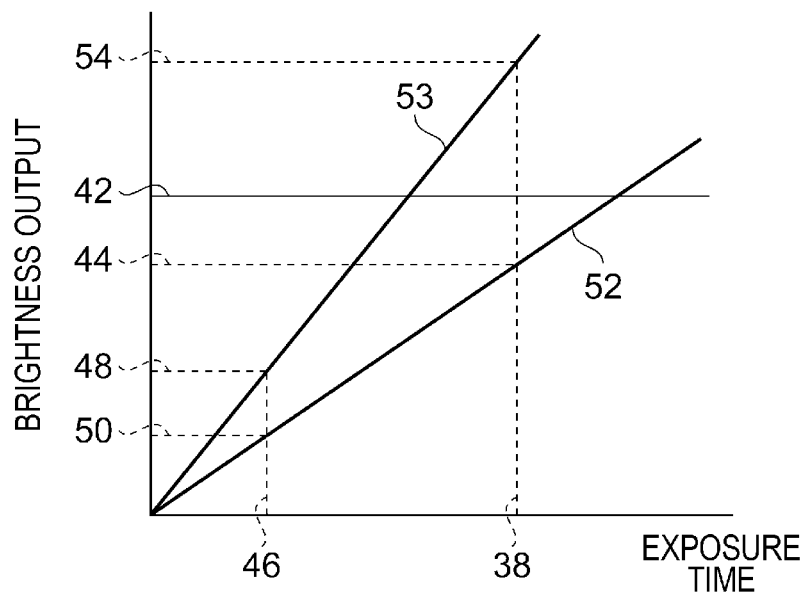
FIGS. 7A and 7B are schematic diagrams for describing the colorimetry method.
Figure 7B:
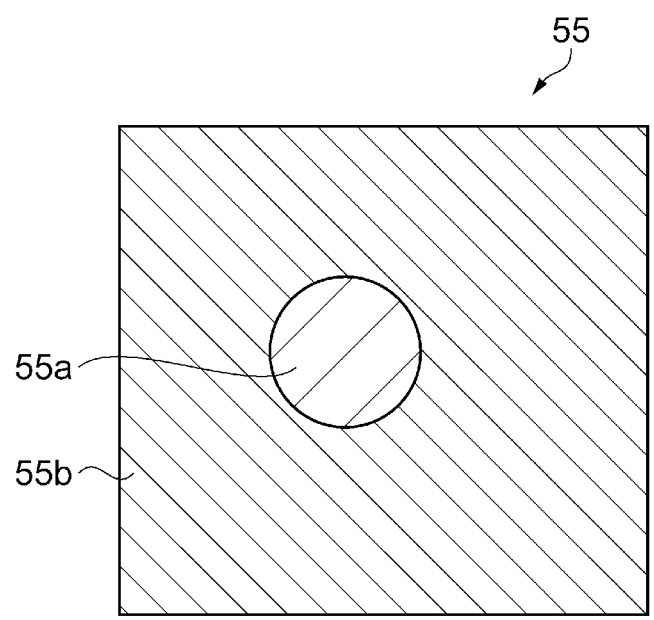

FIGS. 7A and 7B are drawings corresponding to the image synthesis process in the step S6. In FIG. 7A, the vertical axis indicates the brightness output and the horizontal axis indicates the exposure time. A second correlation line 52 indicates the relationship between the brightness output of a location corresponding to the second region 45b and the second region 51b and the exposure time. As indicated by the second correlation line 52, the brightness output and the exposure time have a positive correlation relationship. Accordingly, when the first exposure time 38 is three times the second exposure time 46, the second brightness output 44 is three times the fourth brightness output 50.

A first correlation line 53 indicates the relationship between the brightness output of a location corresponding to the first region 45a and the first region 51a and the exposure time. The first correlation line 53 shows that the brightness output and the exposure time have the same positive correlation relationship as the second correlation line 52. The first exposure time 38 is three times the second exposure time 46. At this time, a first brightness estimation output 54 in the first exposure time 38 is three times the third brightness output 48. Although it is difficult to directly measure the first brightness estimation output 54, and the image calculator 35 calculates the first brightness estimation output 54 through arithmetic operation using the first correlation line 53 and the first exposure time 38.

FIG. 7B shows a third image 55 calculated by the image calculator 35. A first region 55a in the third image 55 is a location at which the brightness output in the first exposure time 38 becomes the saturation output 42, and a location at which the calculation results become the first brightness estimation output 54. A second region 55b is a location at which the brightness output in the first exposure time 38 becomes the second brightness output 44. In this way, the image calculator 35 calculates the third image 55 using the imaging data 30 of the first exposure time 38 and the imaging data 30 of the second exposure time 46.

Figure 8A:
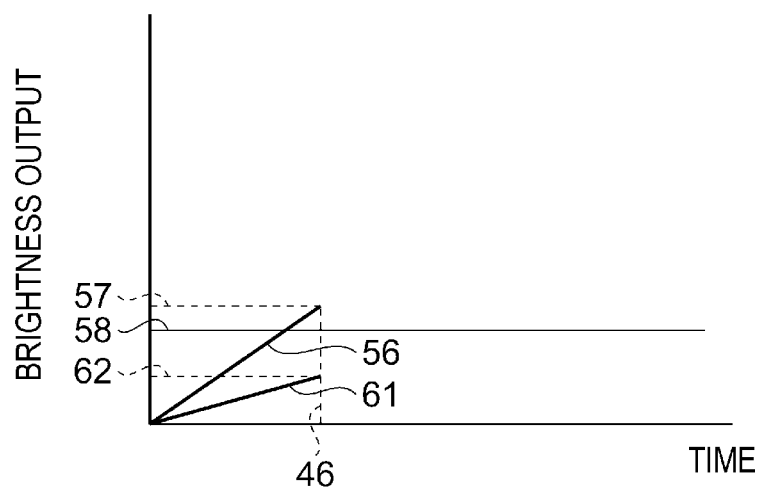
FIGS. 8A and 8B are schematic diagrams for describing the colorimetry method.

FIGS. 8A to 9B are diagrams corresponding to the exposure time setting process in the step S3, the imaging process in the step S4, and the brightness determination process in the step S5. Next, a case where the brightness output is low is described. The vertical and horizontal axes in FIG. 8A are the same as FIG. 5A, and description thereof will not be made. In the step S3, the exposure time calculator 37 sets the exposure time to the second exposure time 46. Next, in the step S4, the imaging device 12 images the measurement object 4.

A fifth brightness transition line 56 shows an example of the transition of the brightness of the image corresponding to a location at which the measurement object 4 is bright. In the fifth brightness transition line 56, a fifth brightness output 57 that is the brightness output when the second exposure time 46 passes exceeds a determination value 58. A sixth brightness transition line 61 shows an example of the transition of the brightness of the image corresponding to a location at which the measurement object 4 is dark. In the sixth brightness transition line 61, a sixth brightness output 62 that is the brightness output when the second exposure time 46 passes is less than the determination value 58.

Figure 8B:
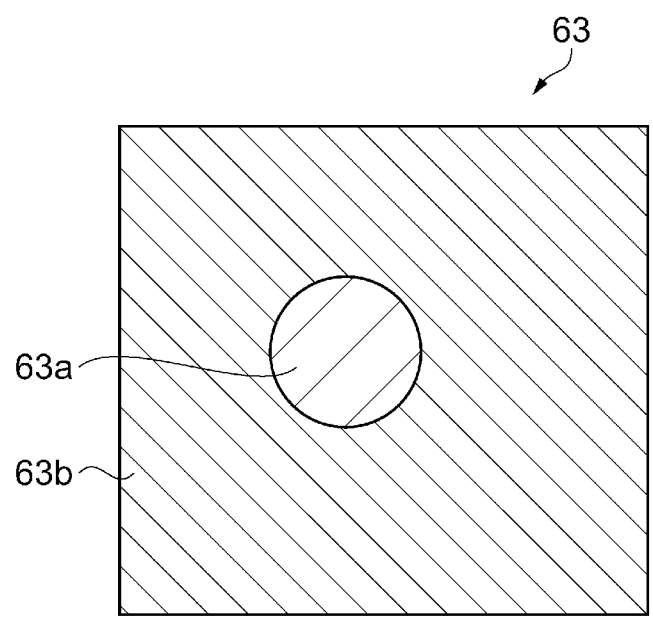

FIG. 8B shows a fourth image 63 output by the imaging device 12. A first region 63a in the fourth image 63 is a region indicated by the fifth brightness transition line 56, and is a location where the brightness output becomes the fifth brightness output 57. A second region 63b is a region indicated by the sixth brightness transition line 61, and is a location at which the brightness output becomes the sixth brightness output 62. In the second region 63b, the brightness output is the sixth brightness output 62, and does not reach the determination value 58.

The brightness determination unit 36 in the step S5 compares the sixth brightness output 62 with the determination value 58. When the sixth brightness output 62 of the dark part is smaller than determination value 58, the brightness determination unit 36 performs determination for re-imaging returning to the step S3. In the step S3, the exposure time calculator 37 sets the exposure time to the first exposure time 38. In the fourth image 63, since the brightness output of the second region 63b is less than the determination value 58, the first exposure time 38 longer than the second exposure time 46 is selected as the exposure time in order to increase the brightness output. Next, in the step S4, the imaging device 12 re-images the measurement object 4.

Figure 9A:
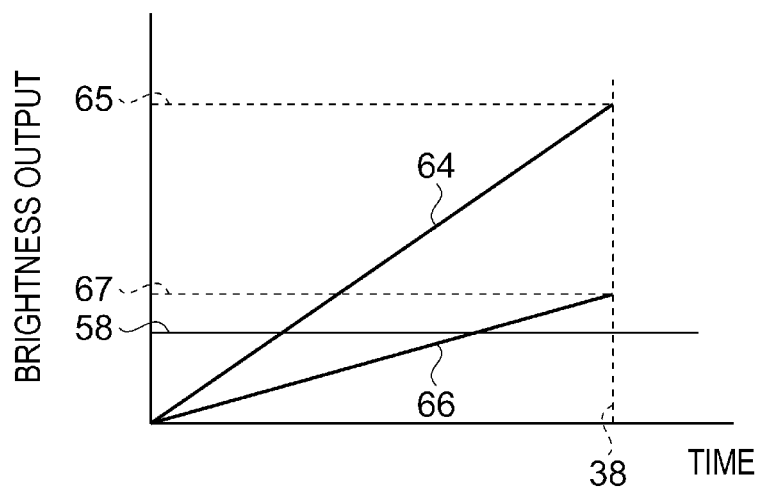
FIGS. 9A and 9B are schematic diagrams for describing the colorimetry method.

The vertical and horizontal axes in FIG. 9A are the same as FIG. 5A, and description thereof will not be made. A seventh brightness transition line 64 shows an example of the transition of the brightness of the image corresponding to a location at which the measurement object 4 is bright. In the seventh brightness transition line 64, a seventh brightness output 65 that is the brightness output when the first exposure time 38 passes exceeds the determination value 58. An eighth brightness transition line 66 shows an example of the transition of the brightness of the image corresponding to a location at which the measurement object 4 is dark. In the eighth brightness transition line 66, an eighth brightness output 67 that is the brightness output when the first exposure time 38 passes is the determination value 58 or higher.

Figure 9B:
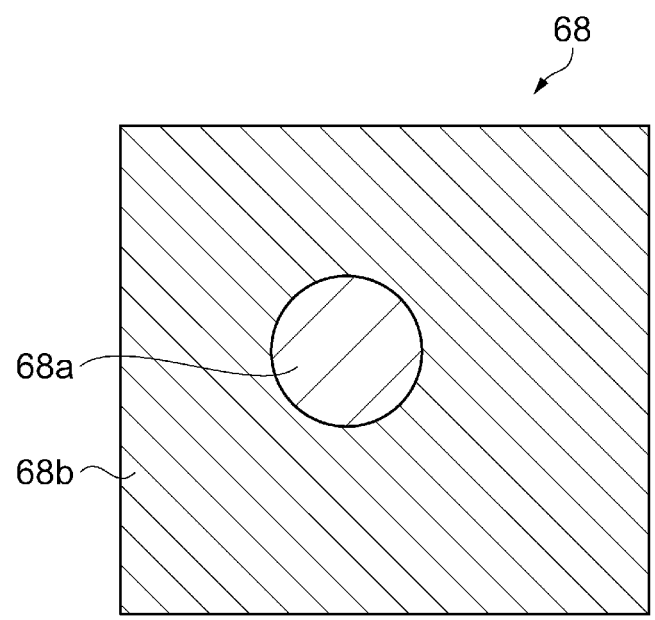

FIG. 9B shows a fifth image 68 output by the imaging device 12. A first region 68a in the fifth image 68 is a region indicated by the seventh brightness transition line 64, and is a location where the brightness output becomes the seventh brightness output 65. A second region 68b is a region indicated by the eighth brightness transition line 66, and is a location at which the brightness output becomes the eighth brightness output 67. As in the drawing, in the fifth image 68, the brightness output of the first region 68a and second region 68b is the determination value 58 or higher.

The brightness determination unit 36 in the step S5 compares the seventh brightness output 65 and the eighth brightness output 67 with the determination value 58. Since the seventh brightness output 65 and the eighth brightness output 67 are the determination value 58 or higher, determination to transition to the step S6 is performed. The seventh brightness output 65 and the eighth brightness output 67 are properly detected. Since synthesizing the fifth image 68 in the step S6 is unnecessary, the process proceeds to the step S7.

Figure 10A:
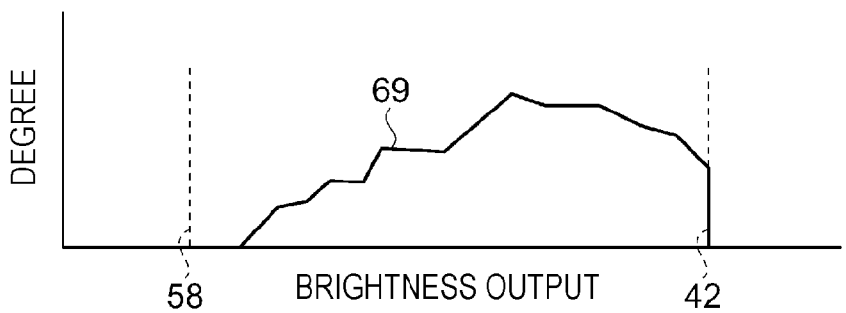
FIGS. 10A to 10D are schematic diagrams for describing the colorimetry method.

FIGS. 10A to 10D are drawings corresponding to the brightness determination process in the step S5. The vertical axis indicates the degree, and the numbers becomes larger toward the upper side from the lower side in the drawing. The horizontal axis indicates the brightness output, and the output becomes greater toward the right side from the left side in the drawing. In FIG. 10A, a first brightness distribution 69 indicates an example of a distribution of brightness in an image imaged by the imaging device 12. The first brightness distribution 69 becomes the brightness output of the determination value 58 or higher. A portion of the brightness output reaches the saturation output 42. At this time, the brightness determination unit performs determination of re-imaging with the exposure time shortened. Steps S3 to S5 are performed, and the image is synthesized in the step S6.

Figure 10B:
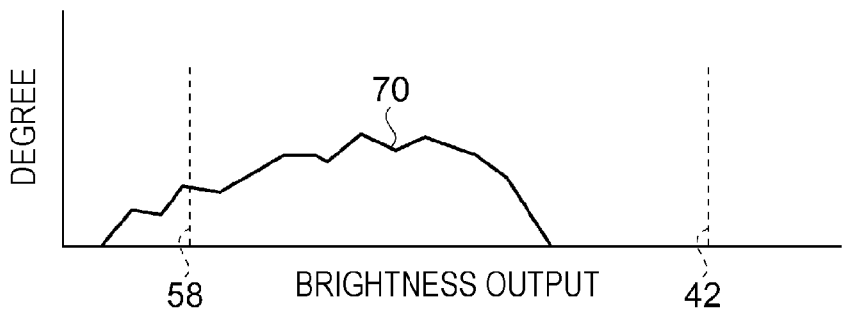

In FIG. 10B, a second brightness distribution 70 indicates an example of a distribution of brightness in an image imaged by the imaging device 12. The second brightness distribution 70 becomes a brightness output in which a portion is less than the determination value 58. The brightness output does not reach the saturation output 42. At this time, the brightness determination unit 36 performs determination of re-imaging with the exposure time lengthened. Steps S3 to S5 are performed, and the image is synthesized in the step S6.

Figure 10C:
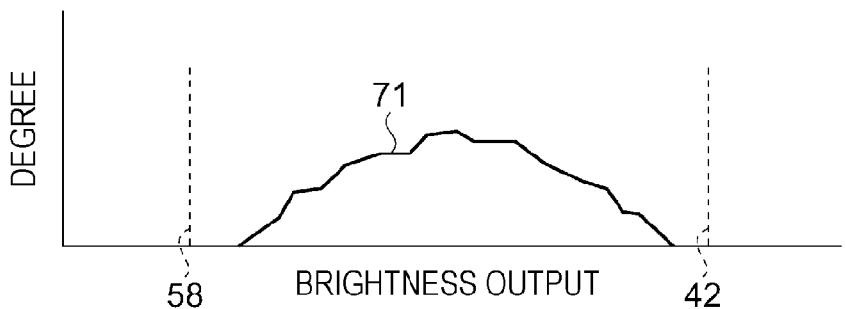

In FIG. 10C, a third brightness distribution 71 shows an example of a distribution of brightness in an image imaged by the imaging device 12. The third brightness distribution 71 becomes the brightness output of the determination value 58 or more. The brightness output does not reach the saturation output 42. At this time, the brightness determination unit 36 proceeds to the step S6. In the step S6, since synthesizing the image is unnecessary, the process proceeds to the step S7 without performing image synthesis.

Figure 10D:
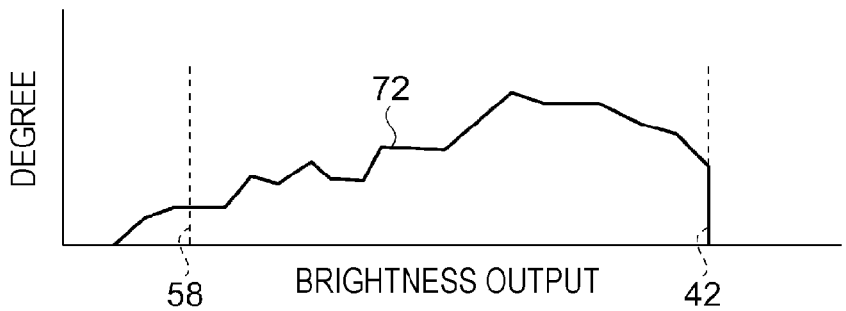

In FIG. 10D, a fourth brightness distribution 72 indicates an example of a distribution of brightness in an image imaged by the imaging device 12. The fourth brightness distribution 72 becomes the brightness output in which a portion is less than the determination value 58. A portion of the brightness output reaches the saturation output 42. At this time, the brightness determination unit 36 performs re-imaging with the exposure time shortened, and further performs the decision for re-imaging with the exposure time lengthened. Steps S3 to S5 are performed twice, and the image is synthesized in the step S6.

As above, the determination of re-imaging is performed in the brightness determination process in the step S5. Re-imaging is performed only in cases where the re-imaging is necessary. Accordingly, it is possible to shorten the time for colorimetry compared to methods that perform a plurality of imagings changing the exposure time each time.

In the measurement object removal process in the step S7, as shown in FIG. 1, the measurement object 4 arranged on the mounting stand 3 is removed being moved from the mounting stand 3. The colorimetry of one color finishes according to the above processes. When measuring the distribution of a plurality of colors in the same measurement object 4, the process may transition from the step S6 to the step S2.

Figure 11:
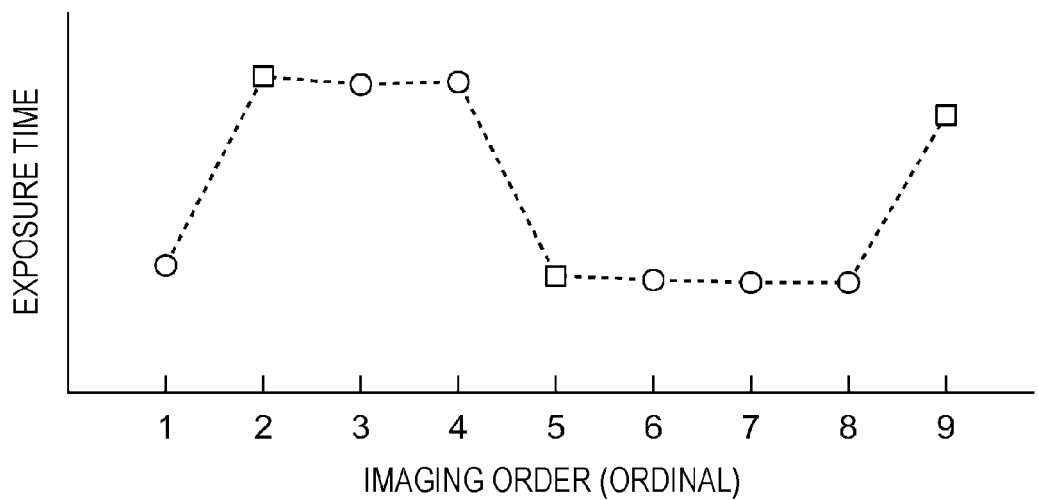
FIG. 11 is a schematic diagram for describing the colorimetry method.

FIG. 11 is a drawing corresponding to the brightness determination process in the step S5. In FIG. 11, the vertical axis indicates the exposure time, and the time on the upper side in the drawing is longer than that on the lower side. The horizontal axis indicates the imaging order, and measurement is performed in the order from the left side to the right side in the drawing. The round plots indicate normal imaging, and the square plots indicate re-measurement. Firstly, in the first imaging, the exposure time is a short time, and in the second imaging, re-imaging is performed while changing the exposure time. At this time, the exposure time calculator 37 stores the exposure time in the memory 24 as the exposure time data 32. The third and fourth imagings are normal imagings, and the exposure time calculator 37 inputs and sets the exposure time data 32 from the memory 24.

In the fifth imaging, re-imaging is performed while changing the exposure time. At this time, the exposure time calculator 37 stores the exposure time in the memory 24 as the exposure time data 32. The sixth to eighth imagings are normal imagings, and the exposure time calculator 37 inputs and sets the exposure time data 32 from the memory 24. In the ninth imaging, re-imaging is performed while changing the exposure time. At this time, the exposure time calculator 37 stores the exposure time in the memory 24 as the exposure time data 32.

During re-imaging, the exposure time is stored in the memory 24, and imaging after the re-imaging is performed with the exposure time in the re-imaging by setting the stored exposure time. Accordingly, it is possible for the opportunities for re-imaging when continuously measuring similar measurement objects 4 to be reduced. As a result, the time for colorimetry can be shortened.

As described above, according to the embodiment, the following effects are obtained.

(1) According to the embodiment, imaging is performed with the predetermined exposure time, and imaging data 30 is output. Whether the brightness of the imaging data 30 is within the predetermined range is determined. Re-imaging is performed while changing the exposure time when the brightness of the imaging data 30 is not within the predetermined range. When the brightness of the imaging data 30 is within the predetermined range, the imaging data 30 is utilized as is.

There are times when the brightness of the imaging data 30 is excessively low or excessively high to be saturated. As a counter measure, there are methods of utilizing the imaging data having the brightness within the predetermined range after imaging with a plurality of exposure times. Unlike these methods, in the embodiment, re-imaging is performed only when necessary after determining the imaging data 30. Accordingly, it is possible to reduce the number of imagings, and thus it is possible to perform colorimetry in a short time. As a result, the width of the brightness can be maintained, thereby shortening the time for colorimetry.

(2) According to the embodiment, re-imaging is performed with the exposure time lengthened when the brightness of the imaging data 30 is less than a determination value. In so doing, it is possible to raise the brightness in locations where the brightness of the imaging data 30 is low. The width of the brightness can be widened. Re-imaging is performed with the exposure time shortened when the brightness of the imaging data is saturated. In so doing, it is possible to measure the brightness at a location where the brightness of the imaging data 30 is excessively high and the brightness is unclear. Accordingly, even at locations where the brightness of the imaging data is low or at locations where the brightness is high, it is possible to raise the width of the brightness.

(3) According to the embodiment, the exposure time during re-imaging is stored. Imaging after the re-imaging is performed with the stored exposure time. Accordingly, it is possible for the opportunities for re-imaging when continuously measuring similar measurement objects 4 to be reduced. As a result, the time for colorimetry can be shortened.

Second Embodiment

Figure 12:
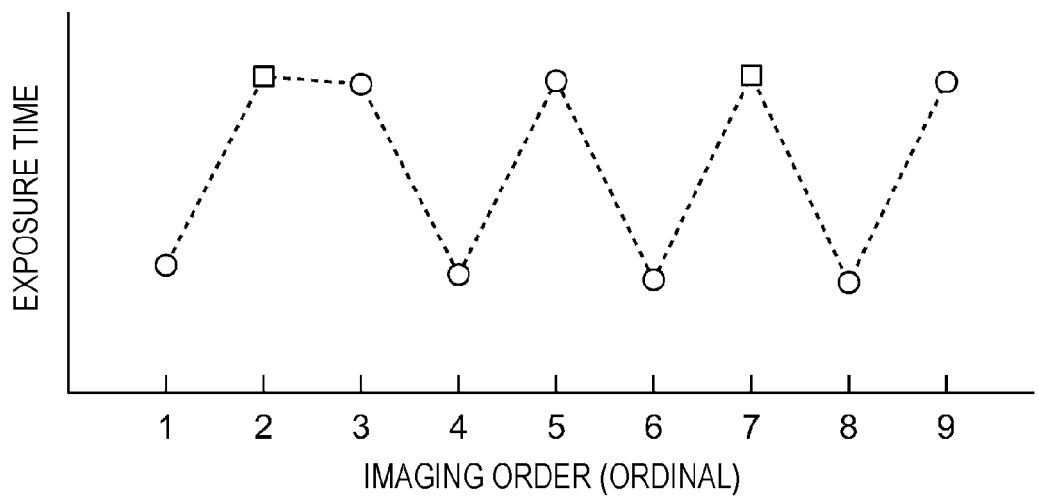
FIG. 12 is a diagram for describing a colorimetry method according to a second embodiment.

Next, an embodiment of the colorimetry method is described using drawings for describing the colorimetry method of FIG. 12. The embodiment differs from the first embodiment on the feature that the operator performs setting of the exposure time shown in FIG. 11. The same features as the first embodiment will not be described.

FIG. 12 is a drawing corresponding to the brightness determination process in the step S5. The vertical and horizontal axes in FIG. 12 are the same as FIG. 11, and description thereof will not be made. That is, in the embodiment, in the first imaging, the exposure time is a short time, and in the second imaging, re-imaging is performed while changing the exposure time to a long exposure time. The third to sixth imagings are normal imagings. At this time, the operator sets the exposure time while checking the measurement object 4. In the seventh imaging, re-imaging is performed while changing the exposure time to a long exposure time. The eighth and ninth imagings are normal imagings. At this time, the operator sets the exposure time while checking the measurement object 4.

As described above, according to the embodiment, the following effects are obtained.

(1) According to the embodiment, imaging after the re-imaging is performed by an operator setting the exposure time. An operator sets an exposure time that matches the measurement object 4 with reference to the exposure time during re-imaging. Accordingly, the opportunities for re-imaging can be reduced, and thus the time for colorimetry can be shortened.

Third Embodiment

Next, an embodiment of the colorimetry method is described using drawings for describing the colorimetry method of FIGS. 13 to 15. The embodiment differs from the first embodiment on the feature of performing determination of re-imaging for each row of output of the imaging device 12. Also, the light receiving element array 7 is changed from a CCD image sensor to a CMOS image sensor. In so doing, the light receiving element array 7 is able to output the imaging data for each row. The same features as the first embodiment will not be described.

Figure 13A:
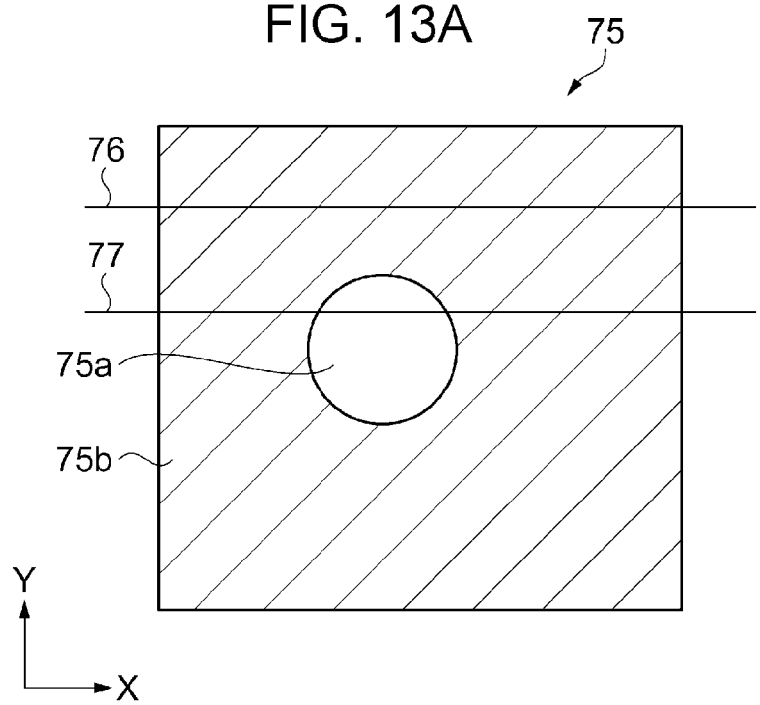
FIGS. 13A to 13C are diagrams for describing the colorimetry method according to a third embodiment.

FIG. 13A shows an image 75 imaged by the imaging device 12. A first region 75a is a bright region, and a second region 75b is a dark region. The image 75 is two-dimensional data having a plurality of rows. The horizontal direction in the drawing is the X direction. The X direction is the horizontal scanning direction. The vertical direction is the Y direction. The Y direction is the vertical scanning direction. One scanning line for scanning only the second region 75b is a first scanning line 76. One scanning line for scanning only the first region 75a and the second region 75b is a second scanning line 77.

Figure 13B:

In the imaging process in the step S4, one horizontal scanning is performed. In the brightness determination process in the step S5, determination is performed for the output of one horizontal scanning. FIG. 13B shows the distribution of the brightness output in the first scanning line 76. The vertical axis indicates the brightness output of each pixel in the imaged image. The upper side in the drawing shows a greater output than the lower side. The horizontal axis shows the position in the X direction. A first brightness distribution line 78 shows the distribution of the brightness output in the first scanning line 76. The first brightness distribution line 78 is a brightness distribution line for one line. The brightness output is within a range between the determination value 58 and the saturation output 42 in the first scanning line 76, as shown by the first brightness distribution line 78. Accordingly, the brightness determination unit 36 performs determination of transitioning to the next horizontal scanning.

Figure 13C:
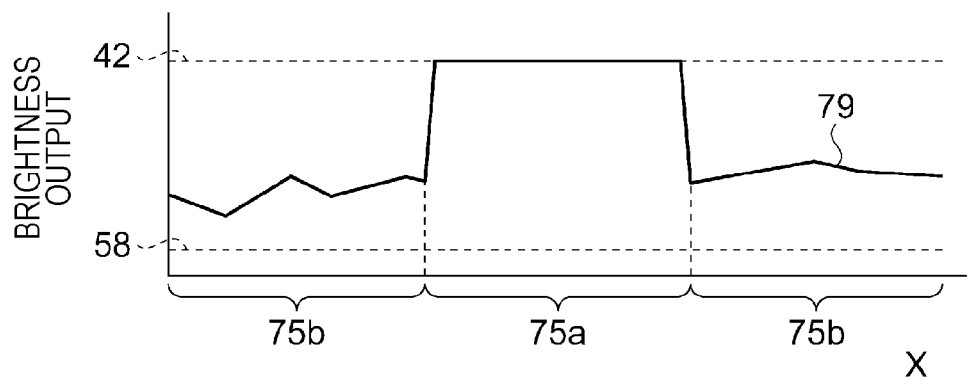

FIG. 13C shows the distribution of the brightness output in the second scanning line 77. The vertical and horizontal axes are the same as FIG. 13B, and description thereof will not be made. A second brightness distribution line 79 shows the distribution of the brightness output in the second scanning line 77. The second brightness distribution line 79 is a brightness distribution line for one line. The brightness output becomes the determination value 58 or more in the second scanning line 77, as shown by the second brightness distribution line 79. In the first region 75a, a portion of the brightness output of the second brightness distribution line 79 becomes the saturation output 42. Accordingly, the brightness determination unit performs determination of re-imaging along the second scanning line 77 with the exposure time shortened.

Figure 14A:
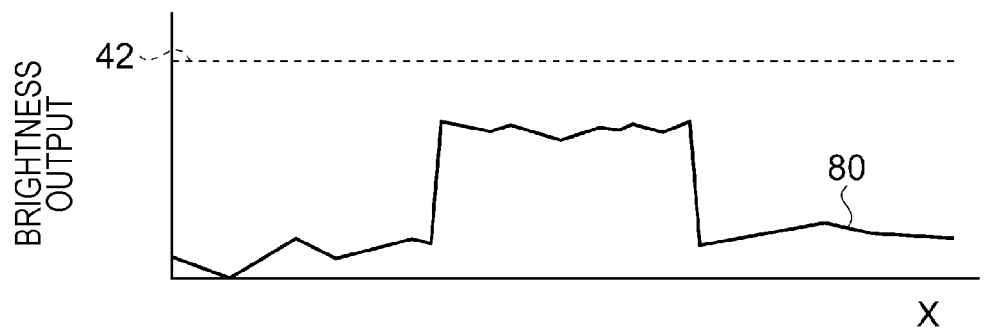
FIGS. 14A to 14C are diagrams for describing the colorimetry method.

In the exposure time setting process in the step S3, the exposure time is set to be short, and in the imaging process in the step S4, re-imaging is performed along the second scanning line 77. The exposure time calculator 37 stores the changed exposure time in the memory 24 as the exposure time data 32. FIG. 14A shows the distribution of the brightness output in the second scanning line 77 during re-imaging. The vertical and horizontal axes are the same as FIG. 13B, and description thereof will not be made. A third brightness distribution line 80 shows the distribution of the brightness output in the imaging data re-imaged along the second scanning line 77. The brightness output is less than the saturation output 42 in the second scanning line 77, as shown by the third brightness distribution line 80. Accordingly, the brightness determination unit 36 performs determination of transitioning to the image synthesis process in the step S6.

Figure 14B:
Figure 14C:
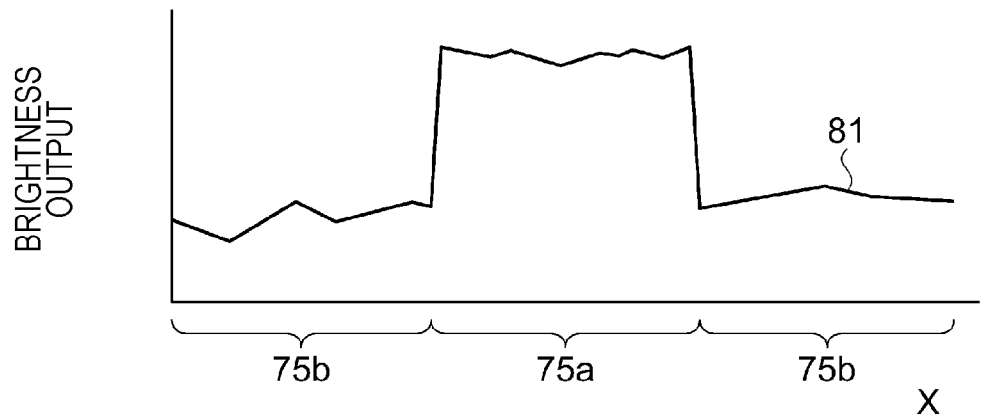

FIG. 14B is a drawing showing the same first brightness distribution line 78 as FIG. 13B. In the step S6, the first brightness distribution line 78 and the third brightness distribution line 80 are synthesized. FIG. 14C shows a fourth brightness distribution line 81 calculated by the image calculator 35. The vertical and horizontal axes are the same as FIG. 13B, and description thereof will not be made. The first brightness distribution line 78 is used for the second region 75b of the fourth brightness distribution line 81, and the data obtained by a calculation that triples the third brightness distribution line 80 is used for the first region 75a.

The steps S3 and S4 are performed on the next row of the second scanning line 77. At this time, the imaging controller 34 inputs the exposure time data 32 from the memory 24, thereby controlling the imaging device 12. Imaging is performed with the exposure time at the re-measurement. In so doing, it is possible to increase the possibility of being able to not perform the re-imaging step when a distribution of the brightness of the next row of the second scanning line 77 is similar to that of the second scanning line 77.

Figure 15A:
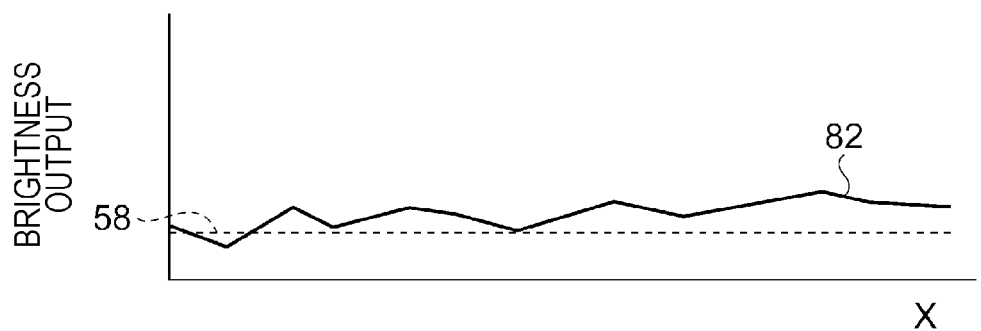
FIGS. 15A to 15B are diagrams for describing the colorimetry method.

FIG. 15A shows the distribution of the brightness output in the first scanning line 76 in another example. The vertical and horizontal axes are the same as FIG. 13B, and description thereof will not be made. A fifth brightness distribution line 82 shows the distribution of the brightness output in the first scanning line 76. The fifth brightness distribution line 82 is a brightness distribution line for one line. A location is present at which the brightness output is less than the determination value 58 in the first scanning line 76, as shown by the fifth brightness distribution line 82. Accordingly, the brightness determination unit 36 performs determination of re-imaging along the first scanning line 76 with the exposure time shortened.

Figure 15B:
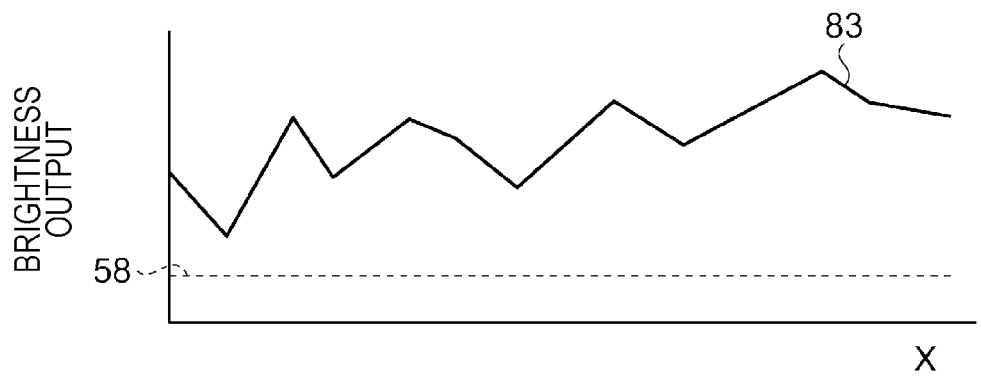

In the exposure time setting process in the step S3, the exposure time is set to be long, and in the imaging process in the step S4, re-imaging is performed along the first scanning line 76. The exposure time calculator 37 stores the changed exposure time in the memory 24 as the exposure time data 32. FIG. 15B shows the distribution of the brightness output in the first scanning line 76 during re-imaging. The vertical and horizontal axes are the same as FIG. 13B, and description thereof will not be made. A sixth brightness distribution line 83 shows the distribution of the brightness output in the imaging data re-imaged along the first scanning line 76. In the first scanning line 76, the brightness output is the determination value 58 or more as shown by the sixth brightness distribution line 83. The brightness output becomes less than the saturation output 42. Accordingly, the brightness determination unit 36 performs determination of transitioning to the image synthesis process in the step S6. Since the image synthesis is unnecessary, the process proceeds to the step S7 without the image synthesis in the step S6.

The steps S3 and S4 are performed on the next row of the first scanning line 76. At this time, the imaging controller 34 inputs the exposure time data 32 from the memory 24, thereby controlling the imaging device 12. Imaging is performed with the exposure time at the re-measurement. In so doing, it is possible to increase the possibility of being able to not perform the re-imaging step when a distribution of the brightness of the next row of the first scanning line 76 is similar to that of the sixth brightness distribution line 83.

As described above, according to the embodiment, the following effects are obtained.

(1) According to the embodiment, the imaging data 30 is two-dimensional data having a plurality of rows. The brightness determination unit 36 determines whether the brightness of one row of the imaging data is within the predetermined range. One row is re-imaged with the exposure time changed when re-imaging is necessary. Compared to imaging one screen, the time needed for imaging of one row is short. Accordingly, compared to when imaging and re-imaging are performed for each screen, the time for colorimetry can be shortened when performing imaging and re-imaging for each line.

(2) According to the embodiment, the exposure time of the re-imaged row is stored in the memory 24. Imaging of the next row is performed with the stored exposure time. Accordingly, it is possible to reduce the opportunities for re-imaging when measuring the measurement object 4 with a form in which the brightness of the next row is similar in the imaging data imaged. As a result, the time for colorimetry can be shortened.

Fourth Embodiment

Next, an embodiment of the colorimetry method is described using drawings for describing the colorimetry method of FIG. 16. The embodiment differs from the first embodiment on the feature of performing determination of re-imaging for each row of output of the imaging device 12. Also, the light receiving element array 7 is changed from a CCD image sensor to a CMOS image sensor. The light receiving element array 7 has a signal processing circuit built-in, and is an intelligent image capture device that controls the accumulation time of current that the photodiodes output for each pixel. In so doing, the light receiving element array 7 is able to perform continuous imaging and output the imaging data without reset. The same features as the first embodiment will not be described.

Figure 16A:
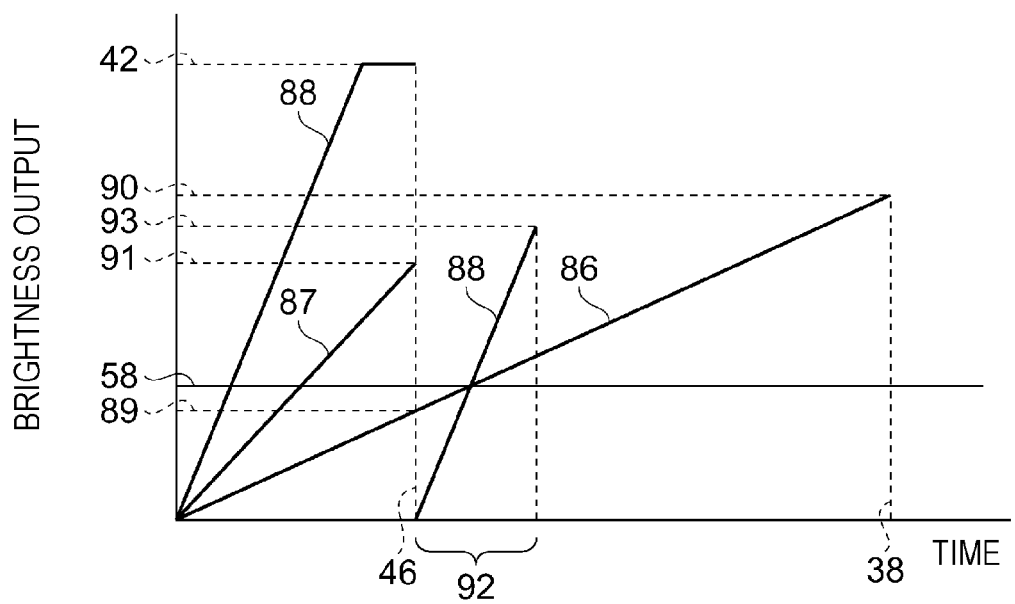
FIGS. 16A and 16B are diagrams for describing a colorimetry method according to a fourth embodiment.

FIG. 16 is a diagram corresponding to the exposure time setting process in the step S3, the imaging process in the step S4, the brightness determination process in the step S5, and the image synthesis process in the step S6. In FIG. 16A, the horizontal axis indicates the passage of time from when the imaging device 12 starts imaging. The vertical axis indicates the brightness output of one pixel in the imaged image. The upper side in the drawing shows a greater output than the lower side.

In the step S3, the exposure time is set to the second exposure time 46, and imaging is performed in the step S4. A ninth brightness transition line 86 in the drawing indicates the process of brightness output at a dark location, and a tenth brightness transition line 87 indicates the process of the brightness output at a middle bright location. An eleventh brightness transition line 88 shows a process of the brightness output at a bright location.

A ninth brightness temporary output 89 that is the brightness output at a dark location becomes lower than the determination value 58 when the second exposure time 46 passes, as shown by the ninth brightness transition line 86. The brightness determination unit 36 re-sets the exposure time to the first exposure time 38, and the imaging controller 34 continues the imaging at the pixel. A ninth brightness output 90 that is the brightness output when the exposure time is the first exposure time 38 is stored as the imaging data 30.

A tenth brightness output 91 that is the brightness output at a location with a middle brightness becomes the determination value 58 or more and less than the saturation output 42 when the second exposure time 46 passes, as shown by the tenth brightness transition line 87. The brightness determination unit 36 stores the tenth brightness output 91 as the imaging data 30.

The brightness output at a bright location is a value of the saturation output 42 when the second exposure time 46 passes, as shown by the eleventh brightness transition line 88. The brightness determination unit 36 determines to perform the re-imaging. The exposure time calculator 37 sets a third exposure time 92 that is ½ the second exposure time 46 as the exposure time. The imaging controller 34 resets the brightness output and performs re-imaging with the third exposure time 92 as shown by the eleventh brightness transition line 88. An eleventh brightness output 93 that is the brightness output at the point in time at which the third exposure time 92 passes is stored as the imaging data 30.

Figure 16B:
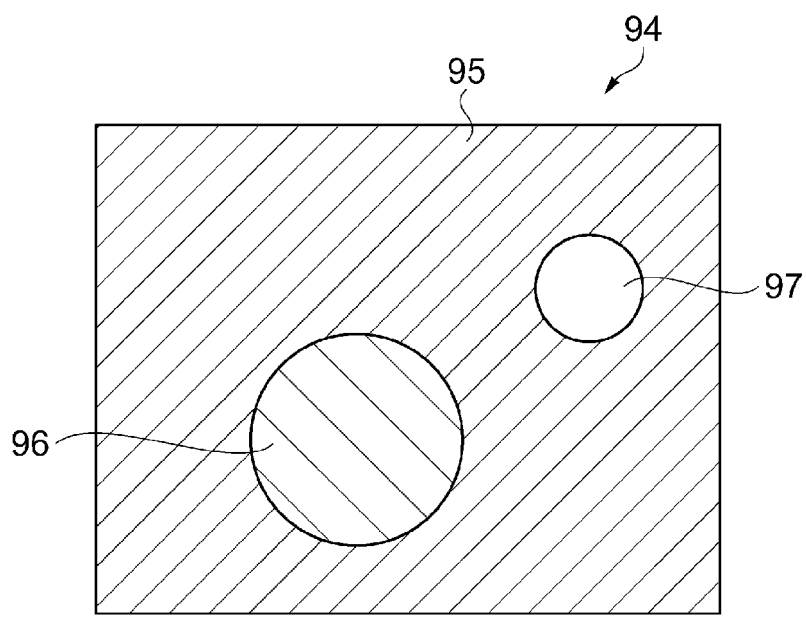

FIG. 16B is an example of a brightness distribution image 94 calculated by the image calculator 35 in the image synthesis process in the step S6. A first region 95 is an image of a dark location, and is a region corresponding to the ninth brightness transition line 86. A second region 96 is an image of a location with a middle brightness, and is a region corresponding to the tenth brightness transition line 87. A third region 97 is an image of a bright location, and is a region corresponding to the eleventh brightness transition line 88.

The first region 95 is a location corresponding to the ninth brightness transition line 86. In the first region 95, imaging is performed setting the exposure time to the first exposure time 38 that is three times the second exposure time 46. The image calculator 35 calculates the brightness with the second exposure time 46 as the reference exposure time. The image calculator 35 calculates the brightness of the first region 95 and sets the result to ⅓ of that of the ninth brightness output 90.

The second region 96 is a location corresponding to the tenth brightness transition line 87. In the second region 96, exposure is performed with the second exposure time 46 that is the reference exposure time. The image calculator 35 sets the brightness of the second region 96 to the tenth brightness output 91.

The third region 97 is a location corresponding to the eleventh brightness transition line 88. In the third region 97, exposure is performed with the third exposure time 92 that is ½ of the second exposure time 46. The image calculator 35 calculates the brightness of the third region 97 and sets the result to a brightness which doubles that of the eleventh brightness output 93. The image calculator 35 calculates the brightness distribution image 94 by calculating the brightness of each pixel.

As described above, according to the embodiment, the following effects are obtained.

(1) According to the embodiment, in the ninth brightness transition line 86, continuous imaging is performed with the exposure time lengthened when the brightness output in the second exposure time 46 is less than a determination value 58. Accordingly, it is possible to shorten the time taken for exposure compared to re-imaging without resetting the brightness. As a result, the time for colorimetry may be shortened.

Fifth Embodiment

Figure 17:
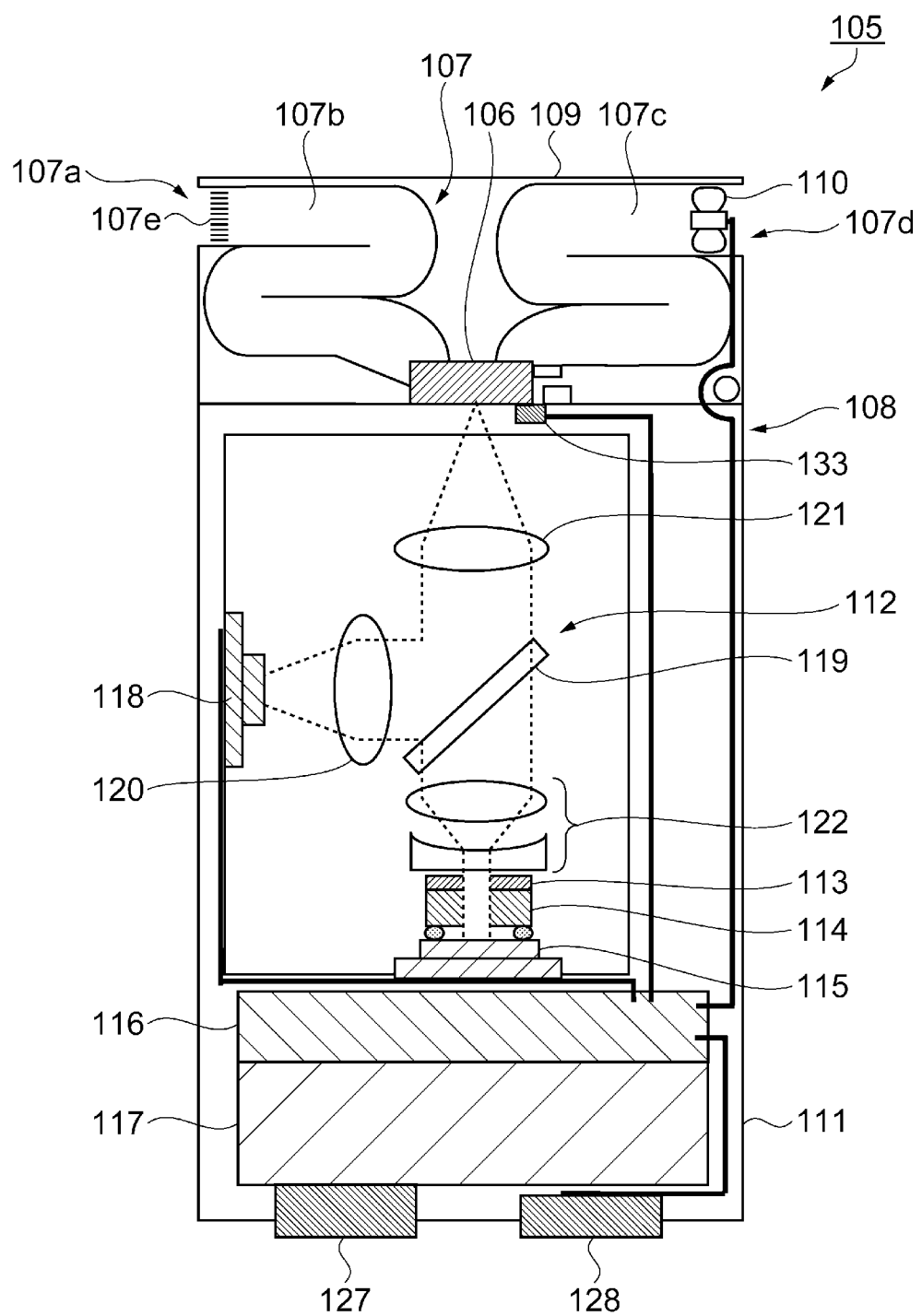
FIG. 17 is a schematic front view showing a configuration of a gas detection device according to a fifth embodiment.
Figure 18:
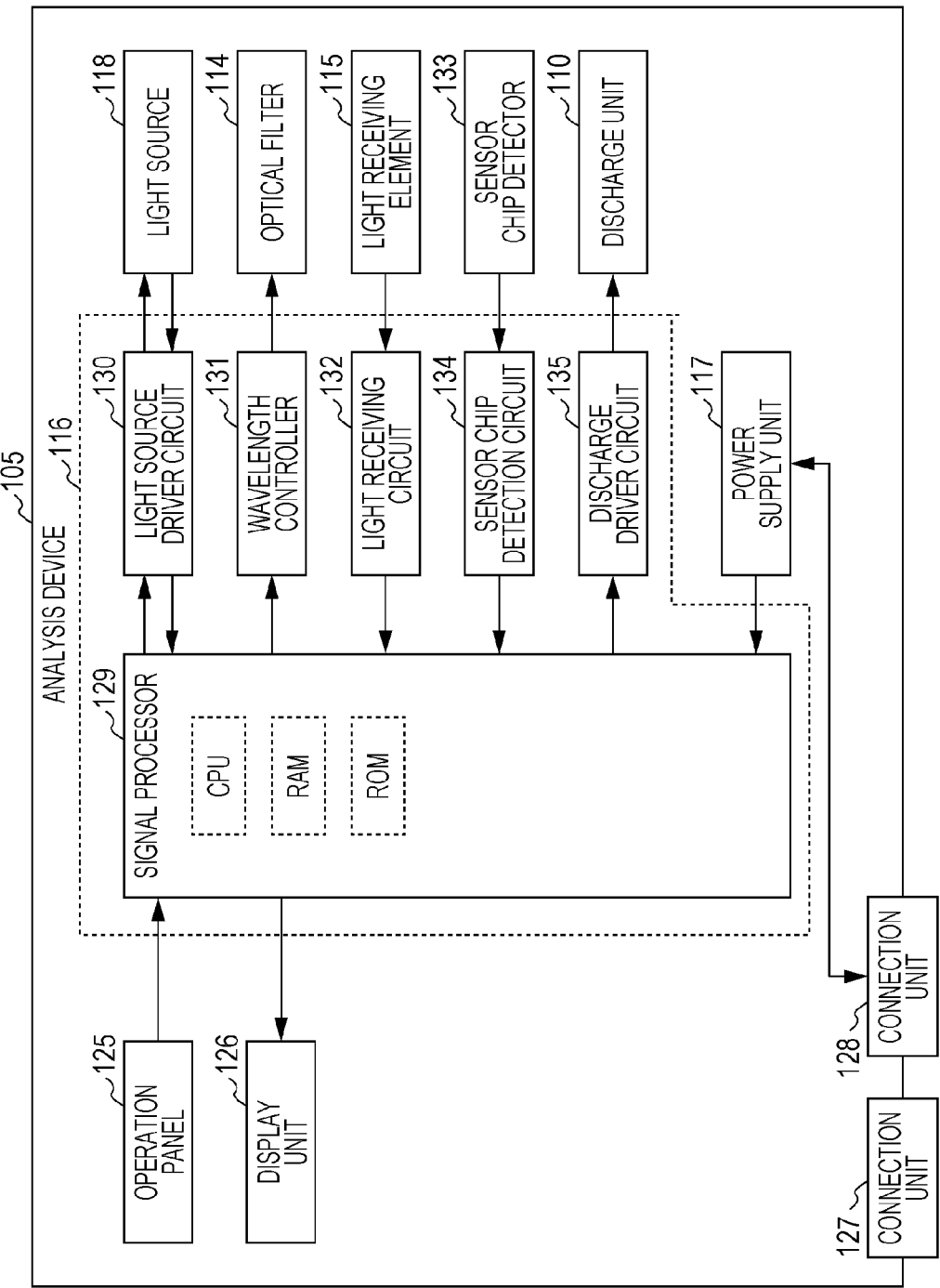
FIG. 18 is a block diagram showing a configuration of a control system of the gas detection device.

Next, an embodiment of a gas detection device provided with the colorimetry device 1 is described using FIGS. 17 and 18. The gas detection device is used in a gas flow detector for a vehicle that detects a specified gas with high sensitivity, a photoacoustic rare gas detector for breath testing, and the like. The same features as the above embodiment will not be described.

FIG. 17 is schematic front view showing a configuration of the gas detection device, and FIG. 18 is a block diagram showing a configuration of a control system of the gas detection device. As shown in FIG. 17, the gas detection device 105 as electronic equipment is configured to include a sensor chip 106, a flow channel 107 provided with a suction port 107a, suction flow channel 107b, discharge flow channel 107c, and discharge port 107d, and a main body unit 108.

The main body unit 108 is provided with a sensor unit cover 109, a discharge unit 110, and a housing 111. The flow channel 107 is able to be attached and detached by opening and closing the sensor unit cover 109. The main body unit 108 is further provided with a detection device including an optical unit 112, a filter 113, a light filter 114, a light receiving element 115 (detection unit), and the like.

The main body unit 108 is further provided with a controller 116 (processor) that processes the detected signal, and controls the detection unit, a power supply unit 117 that supplies electrical power, and the like. The optical unit 112 is configured by a light source 118 that emits light, a beam splitter 119, a lens 120, a lens 121, and a lens 122. The beam splitter 119, reflects light incident from the light source 118 to the sensor chip 106 side, and allows light incident from the sensor chip side to pass through to the light receiving element 115 side.

As shown in FIG. 18, the gas detection device 105 is provided with an operation panel 125, display unit 126, connection unit 127 for interfacing with the outside, and power supply unit 117. The power supply unit 117 may be provided with a connection unit 128 for charging in the case of a secondary battery. The controller 116 of the gas detection device 105 is provided with a signal processor 129 configured by a CPU or the like and a light source driver circuit 130 for controlling the light source 118. The controller 116 is provided with a wavelength controller 131 for controlling the light filter 114, and a light receiving circuit 132 for receiving signals from the light receiving element 115. The wavelength controller 131 includes a function of a control device 13 in the first embodiment. The controller 116 includes a sensor chip detection circuit 134 that reads a code of the sensor chip 106, and receives a signal from a sensor chip detector 133 that detects the presence or absence of the sensor chip 106. The controller 116 includes a discharge driver circuit 135 and the like that controls the discharge unit 110.

Next, the operation of the gas detection device 105 is described. A sensor chip detector 133 is provided on the interior of the sensor unit cover 109 on the upper portion of the main body unit 108. The presence or absence of the sensor chip 106 is detected by the sensor chip detector 133. The signal processor 129 determines that the sensor chip 106 is in an mounted state when a detection signal from the sensor chip detector 133 is detected. The signal processor 129 outputs a display signal that allows that the detection operation is executable to be displayed on the display unit 126.

The operation panel 125 is operated by the operator, and an instruction signal of the starting of the detection process is output from the operation panel 125 to the signal processor 129. First, the signal processor 129 causes the light source 118 to be operated by outputting the light source driving instruction signal to the light source driver circuit 130. When the light source 118 is driven, a stable laser light in which linearly polarized light with a single wavelength is radiated from the light source 118. A temperature sensor and a light quantity sensor are built-into the light source 118, and information of the sensors is output to the signal processor 129. When the signal processor 129 determines that the light source 118 is operating stably based on the temperature and the light quantity input from the light source 118, the signal processor 129 causes the discharge unit 110 to operate by controlling the discharge driver circuit 135. In so doing, a gas sample including a target substance (gas molecule) to be detected is guided from the suction port 107a inside the suction flow channel 107b, and the sensor chip 106, to the discharge flow channel 107c and the discharge port 107d. A dust filter 107e is provided in the suction port 107a and powder and dust with a comparatively large particle size or a part of water vapor is removed.

The sensor chip 106 is an element in which a plurality of metal nanostructures are incorporated, and is a sensor using localized surface plasmon resonance. In such a sensor chip 106, a reinforced electric field is formed between the metallic nanostructures by the laser light. When a gas molecule enters into the reinforced electric field, Rahman scattered light and Rayleigh scattered light including information of molecular vibration are generated. The Rayleigh scatter light and Rahman scattered light are pass through the optical unit 112 and are incident on the filter 113. The Rayleigh scattered light is separated by the filter 113, and the Rahman scattered light is incident on the light filter 114.

The signal processor 129 outputs the control signal to the wavelength controller 131. In so doing, the wavelength controller 131 causes the Rahman scattered light corresponding to the gas molecule that is the detection target to be spectrally diffracted by the light filter 114 by causing the actuator of the light filter 114 to be driven. When the spectrally diffracted light is received by the light receiving element 115, a received signal according to the light receiving amount is output to the signal processor 129 via the light receiving circuit 132.

The signal processor 129 compares the obtained spectrum data of the Rahman scattered light corresponding to the gas molecule that is the detection target and the data stored in the ROM. Specifying of the substance is performed by determining whether the gas molecule that is the detection target is the object gas molecule. The signal processor 129 displays the results thereof on the display unit 126 and outputs the results from the connection unit 127 to the outside.

The gas detection device 105 in which Rahman scattered light is spectrally diffracted by the light filter 114, and gas detection is performed from the spectrally diffracted Rahman scattered light. The gas detection device 105 may be used in which the gas detection device that specifies the gas classification by detecting the individual light absorption degree of gases. In this case, the gas is caused to flow into the interior of the sensor, and the light filter 114 is used in the gas sensor that detects the absorbed light by the gas among the incident light. The gas detection device is an electronic apparatus that analyzes the gas that flows into the sensor by the gas sensor and performed determination thereupon. The gas detection device 105 is able to detect gas components using the light filter 114 by these configurations.

The function of the control device 13 in the first to fourth embodiments is provided in the signal processor 129. The light filter 114, the light receiving element 115, the wavelength controller 131, the light receiving circuit 132, and signal processor 129 function as the colorimetry device. The colorimetry device is able to highly efficiently perform measurement by reducing the opportunities for re-imaging. Accordingly, it is possible for the gas detection device 105 to be an electronic apparatus provided with the colorimetry device able to highly efficiently perform colorimetry.

Sixth Embodiment

Figure 19:
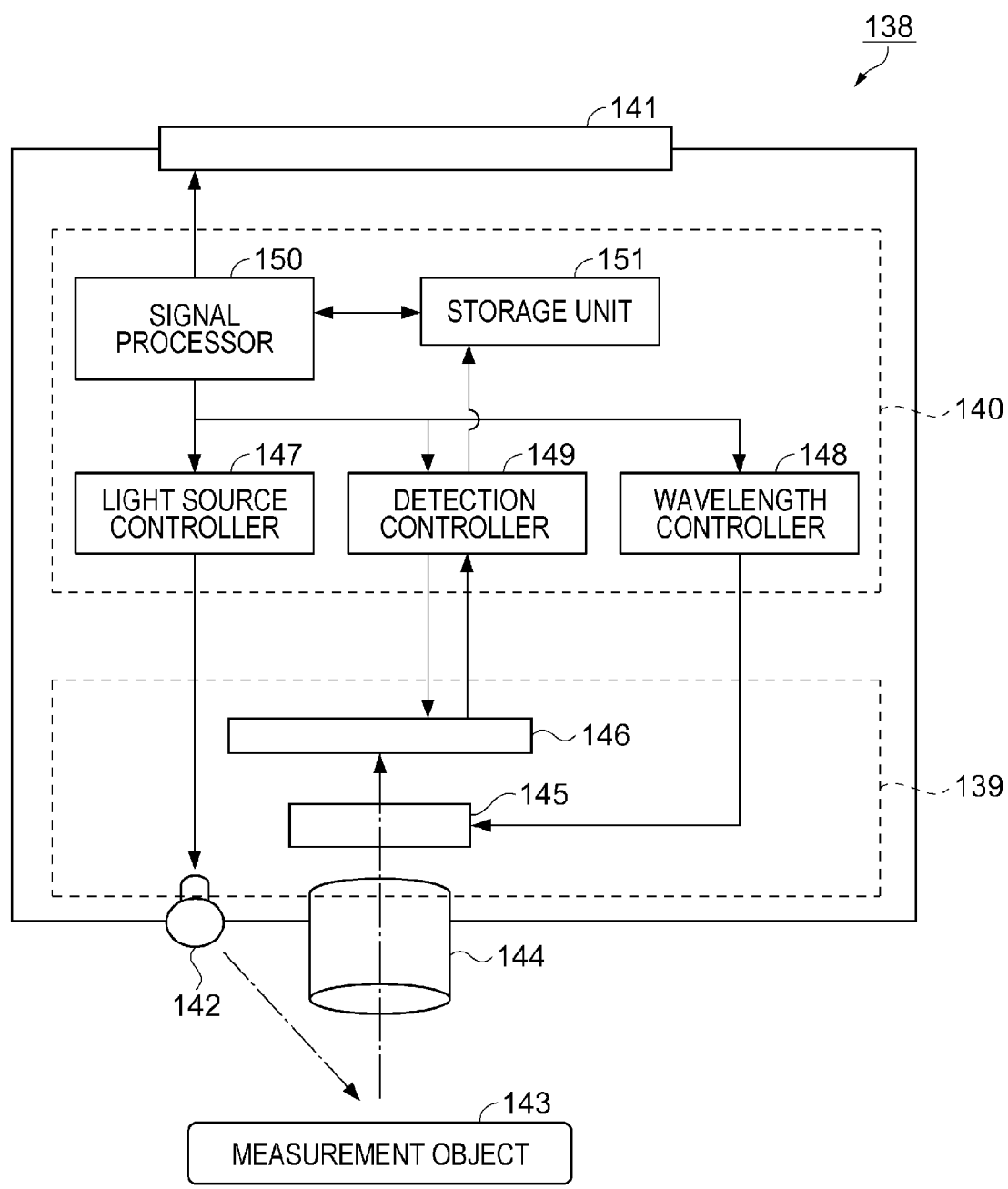
FIG. 19 is a block diagram showing a configuration of a food analysis device according to a sixth embodiment.

Next, an embodiment of a food analysis device provided with the colorimetry device 1 is described using FIG. 19. It is possible for the colorimetry device 1 to be used as substance component analysis device such as a non-invasive colorimetry device for sugars through near-infrared ray spectroscopy or a non-invasive colorimetry device for information about organism, minerals or the like. The food analysis device is one type of substance component analysis device. The same features as the above embodiment will not be described.

FIG. 19 is a block diagram showing a configuration of a food analysis device. As shown in FIG. 19, the food analysis device 138 as an electronic apparatus is provided with a detector 139, a controller 140, and a display unit 141. The detector 139 is provided with a light source 142 that emits light, an imaging lens 144 by which light from the measurement object 143 is guided, and a light filter 145 that spectrally diffracted light guided from the imaging lens 144. The detector 139 is further provided with an imaging unit 146 (detection unit) that detects the spectrally diffracted light.

The controller 140 is further provided with a light source controller 147 that executes lighting and extinguishing control and brightness control at the time of lighting of the light source 142, and a wavelength controller 148 that controls the light filter 145. The wavelength controller 148 includes a function of a control device 13 in the first embodiment. The controller 140 is further provided with a detection controller 149 that controls the imaging unit 146 and acquires a spectral image imaged by the imaging unit 146, a signal processor 150 and a storage unit 151.

When the food analysis device 138 is driven, the light source 142 is controlled by the light source controller 147 and the measurement object 143 is irradiated with light from the light source 142. The light reflected by the measurement object 143 passes through the imaging lens 144 and is incident on the light filter 145. The light filter 145 is driven by control of the wavelength controller 148. In so doing, it is possible to precisely extract light with the object wavelength from the light filter 145. The extracted light is imaged by the imaging unit 146 configured by the CCD camera or the like. The imaged light is accumulated in the storage unit 151 as a spectral image. The signal processor 150 causes the voltage value applied to the light filter 145 to be changed by controlling the wavelength controller 148, and acquires the spectral image for each wavelength.

The signal processor 150 performs calculation processing on the data of each pixel in each image accumulated in the storage unit 151, and obtains the spectrum in each pixel. Information pertaining to the components of a food relating to the spectrum is stored in the storage unit 151. The signal processor 150 analyzes the obtained data of the spectrum based on the information pertaining to the food stored in the storage unit 151. The signal processor 150 obtains the food component and each food component content included in the measurement object 143. The signal processor 150 is able to also calculate the food calories, freshness, and the like from the obtained food components and content. By analyzing the spectral distribution in the image, the signal processor 150 is able to execute extraction of parts in the food that is the detection target in which the freshness is lowered. The signal processor 150 is further able to execute detection of foreign materials included in the food. The signal processor 150 performs processing in which the information such as the components, content, calories, and freshness of the food that is the detection target obtained as described above is displayed on the display unit 141.

The controller 140 is provided with the function of the control device 13 in the first to fourth embodiments. The light filter 145, imaging unit 146, wavelength controller 148, detection controller 149, storage unit 151, and signal processor 150 function as the colorimetry device. The colorimetry device is able to highly efficiently perform measurement by reducing the opportunities for re-imaging. Accordingly, it is possible for the food analysis device 138 to be an electronic apparatus provided with the colorimetry device able to efficiently perform colorimetry.

In addition to the food analysis device 138, utilization as a non-invasive measurement device of other information as described above is possible through substantially the same configuration. For example, use is possible as a bioanalytical device that analyzes biological components such as measurement and analysis of body fluid components, such as blood. It is possible to use a food analysis device 138 in a device that measures body fluid components such as blood as the bioanalytical device. In addition, if using a device that detects ethyl alcohol, it is possible to use the food analysis device 138 in an intoxicated driving prevention device that detects the intoxication state of a driver. Use as an electronic endoscope system provided with such as bioanalytical device is also possible. Use as a mineral analysis device that executes component analysis of minerals is also possible.

Seventh Embodiment

Figure 20:
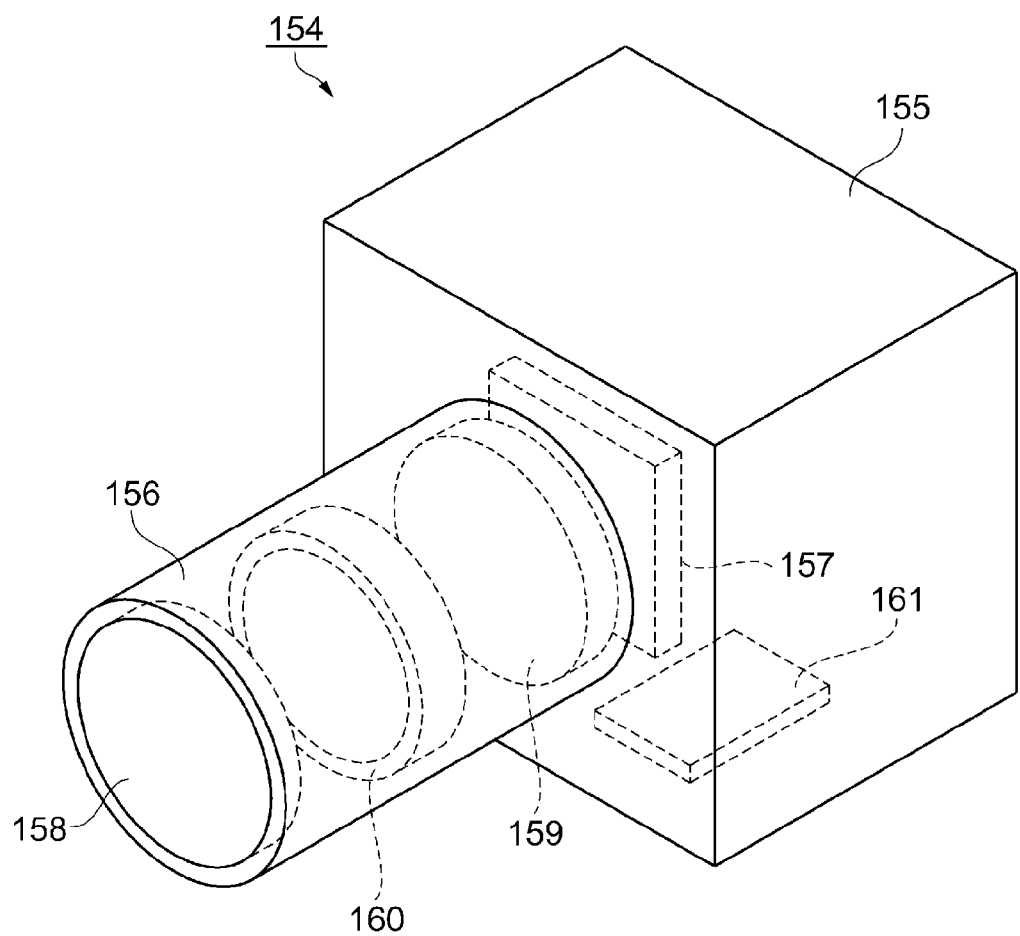
FIG. 20 is a schematic perspective view showing a configuration of a spectroscopic camera according to a seventh embodiment.

Next, an embodiment of a spectroscopic camera provided with the colorimetry device 1 is described using FIG. 20. It is possible to use the colorimetry device 1 in a spectroscopic camera or a spectral analyzer that images a spectral image by spectrally diffracting light. Examples of such a spectroscopic camera include infrared cameras with the same device as the colorimetry device 1 built-in. The same features as the above embodiment will not be described.

FIG. 20 is a schematic perspective view showing a configuration of a spectroscopic camera. As shown in FIG. 20, the spectroscopic camera 154 as the electronic apparatus is provided with a camera main body 155, imaging lens unit 156, and imaging unit 157. The camera main body 155 is a part that is grasped and operated by the operator.

The imaging lens unit 156 is connected to the camera main body 155 and guides incident image light to the imaging unit 157. The imaging lens unit 156 is configured to be provided with an object lens 158, an image-forming lens 159, and a light filter 160 provided between these lenses. A controller 161 that controls the wavelength of light spectrally diffracted by the light filter 160 and controls the imaging unit 157 is arranged in the camera main body 155.

The imaging unit 157 is configured by a light receiving element, and images image light guided by the imaging lens unit 156. The spectroscopic camera 154 allows light with a wavelength that imaging target to pass through the light filter 160, and the imaging unit 157 images a spectral image of light with the desired wavelength.

The function of the control device 13 in the first to fourth embodiments is provided in the controller 161. The light filter 160, imaging unit 157, and controller 161 function as the colorimetry device. The colorimetry device is able to highly efficiently perform measurement by reducing the opportunities for re-imaging. Accordingly, it is possible for the spectroscopic camera 154 to be an electronic apparatus provided with the colorimetry device able to efficiently perform colorimetry.

The colorimetry device 1 may be used as a bioidentification device, and, for example, application is also possible in an identification device of blood, fingerprints, the retina, the iris, and the like using light in the near infrared range or the visible range. It is possible to use the colorimetry device 1 in a concentration detection device. In this case, the infrared energy (infrared light) emitted from the substance is spectrally diffracted and analyzed by the colorimetry device 1, and the analyte concentration in the sample is measured.

As shown above, it is also possible for the colorimetry device 1 to be applied any device that measured predetermined light from incident light. It is possible for the colorimetry device 1 to efficiently measure a plurality of wavelengths. Therefore, it is possible to efficiently execute measurement of a spectrum with a plurality of wavelengths, and detection of a plurality of components. Also at this time, because it is possible for the colorimetry device 1 to efficiently perform measurement, it is possible to an electronic apparatus using the colorimetry device 1 to efficiently perform colorimetry of light with a plurality of wavelengths.

Embodiments are not limited to the above-described embodiments, and various modifications and improvement are possible by a person with ordinary skill in the art may be added within the technical idea of the invention.

Modification Examples are shown below.

Modification Example 1

In the first embodiment, imaging is performed without saturation during re-imaging. Imaging may be further performed with the exposure time shortened when saturated in the re-imaging. It is possible to perform precise colorimetry.

Modification Example 2

In the first embodiment, the exposure time was a two-stage example with a first exposure time 38 and second exposure time 46. The exposure time may have three or more stages. It is possible for precise colorimetry to be performed corresponding to the light quantity of light 8 irradiating the measurement object 4.

Modification Example 3

In the first embodiment, re-imaging is performed when a part of the brightness output is lower than the determination value 58. Re-imaging may be performed when the maximum value of the brightness output is lower than the determination value 58. It is possible to perform precise colorimetry. The content of Modification Examples 1 to 3 may also be applied to the second to seventh embodiments.

Above invention is applied not only to a colorimetry method and to a colorimetry device but also to a common spectral measurement method and to a common spectral measurement device and to any apparatus utilizing a spectroscopy.

The entire disclosure of Japanese Patent Application No. 2014-167262 filed on Aug. 20, 2014 is expressly incorporated by reference herein.

What is claimed is:

1. A colorimetry method for causing a processor to execute computer-readable instructions stored in a memory, the method comprising executing on the processor the steps of:

setting first and second wavelengths of reflected light that is reflected at an object, the first and second wavelengths being different from each other, the first and second wavelengths corresponding to first and second colors of the object, respectively, the reflected light passing through a filter having first and second reflection films, the first and second films being spaced apart from each other via a gap, wherein when the gap is a first gap distance, only the first wavelength passes through the filter, and when the gap is a second gap distance different from the first gap distance, only the second wavelength passes through the filter;

imaging the object with a first exposure time at a first time so as to have a first captured image corresponding to the first wavelength;

imaging the object with a second exposure time at a second time different from the first time so as to have a second captured image corresponding the second wavelengths;

outputting first and second imaging data corresponding to the first and second captured images, respectively;

determining whether brightness of the first and second imaging data is within first and second predetermined ranges, respectively;

performing re-imaging the object with a third exposure time different from the first exposure time at a third time so as to have a third captured image, when the brightness of the first imaging data is outside of the first predetermined range;

performing re-imaging the object with a fourth exposure time different from the second exposure time at a fourth time so as to have a fourth captured image, when the brightness of the second imaging data is outside of the second predetermined range;

storing the third exposure time corresponding to the first wavelength in the memory when the brightness of third imaging data corresponding to the third captured image is within the first predetermined range;

storing the fourth exposure time corresponding to the second wavelength in the memory when the brightness of fourth imaging data corresponding to the fourth captured image is within the second predetermined range;

imaging the object with the stored third exposure time at a fifth time that is later than the first and third times when the first color of the object is measured; and imaging the object with the stored fourth exposure time at a sixth time that is later than the second and fourth times when the second color is measured, wherein the third and fourth exposure times are longer than the first and second exposure times, respectively, when the brightness of the first and second imaging data is less than the first and second predetermined ranges, respectively, and the third and fourth exposure times are shorter than the first and second exposure times, respectively, when the brightness of the first and second imaging data is more than the first and second predetermined ranges, respectively.

2. A colorimetry device, comprising:

a light filter that is configured to pass reflected light from an object therethrough, the reflected light including first and second wavelengths different from each other, the first and second wavelengths corresponding to first and second colors of the object, respectively, the light filter having first and second reflection films that is spaced apart from each other via a gap;

a light filter driver that is configured to change the gap to first and second gap distances different from each other, wherein when the gap is the first gap distance, only the first wavelength passes through the light filter, and when the gap is the second gap distance, only the second wavelength passes through the light filter;

a sensor configured to capture an image of the object including first and second captured images corresponding to the first and second wavelengths, respectively, the sensor being configured to output first and second imaging data corresponding to the first and second captured images, respectively;

a processor configured to execute computer-readable instructions stored in a memory so as to:

cause the sensor to image the object with a first exposure time at a first time so as to have the first captured image;

cause the sensor to image the object with a second exposure time at a second time different from the first time so as to have the second captured image;

determine whether brightness of the first and second imaging data is within first and second predetermined ranges, respectively;

cause the sensor to perform re-imaging the object with a third exposure time different from the first exposure time at a third time so as to have a third captured image, when the brightness of the first imaging data is outside of the first predetermined range;

cause the sensor to perform re-imaging the object with a fourth exposure time different from the second exposure time at a fourth time so as to have a fourth captured image, when the brightness of the second imaging data is outside of the second predetermined range;

store the third exposure time corresponding to the first wavelength in the memory when the brightness of third imaging data corresponding to the third captured image is within the first predetermined range;

store the fourth exposure time corresponding to the second wavelength in the memory when the brightness of fourth imaging data corresponding to the fourth captured image is within the second predetermined range;

cause the sensor to image the object with the stored third exposure time at a fifth time that is later than the first and third times when the first color of the object is measured; and cause the sensor to image the object with the stored fourth exposure time at a sixth time that is later than the second and fourth times when the second color is measured, wherein the third and fourth exposure times are longer than the first and second exposure times, respectively, when the brightness of the first and second imaging data is less than the first and second predetermined ranges, respectively, and the third and fourth exposure times are shorter than the first and second exposure times, respectively, when the brightness of the first and second imaging data is more than the first and second predetermined ranges, respectively.

3. An electronic apparatus comprising:

the colorimetry device according to claim 2; and a controller that controls the colorimetry device.

4. A spectral measurement device comprising:

a light source that is configured to emit source light to an object;

a light filter that is configured to pass reflected light from the object therethrough, the reflected light including first and second wavelengths different from each other, the first and second wavelengths corresponding to first and second colors of the object, respectively, the light filter having first and second reflection films that is spaced apart from each other via a gap;

a light filter driver that is configured to change the gap to first and second gap distances different from each other, wherein when the gap is the first gap distance, only the first wavelength passes through the light filter, and when the gap is the second gap distance, only the second wavelength passes through the light filter;

a sensor that is configured to capture an image of the object including first and second captured images corresponding to the first and second wavelengths, respectively, the sensor being configured to output first and second imaging data corresponding to the first and second captured images, respectively; and a processor configured to execute computer-readable instructions stored in a memory so as to:

cause the sensor to image the object with a first exposure time at a first time so as to have the first captured image;

cause the sensor to image the object with a second exposure time at a second time different from the first time so as to have the second captured image;

determine whether brightness of the first and second imaging data is within the first and second predetermined ranges, respectively;

cause the sensor to perform re-imaging the object with a third exposure time different from the first exposure time at a third time so as to have a third captured image, when the brightness of the first imaging data is outside of the first predetermined range;

cause the sensor to perform re-imaging the object with a fourth exposure time different from the second exposure time at a fourth time so as to have a fourth captured image, when the brightness of the second imaging data is outside of the second predetermined range;

store the third exposure time corresponding to the first wavelength in the memory when the brightness of third imaging data corresponding to the third captured image is within the first predetermined range;

store the fourth exposure time corresponding to the second wavelength in the memory when the brightness of fourth imaging data corresponding to the fourth captured image is within the second predetermined range;

cause the sensor to image the object with the stored third exposure time at a fifth time that is later than the first and third times when the first color of the object is measured; and cause the sensor to image the object with the stored fourth exposure time at a sixth time that is later than the second and fourth times when the second color is measured, wherein the third and fourth exposure times are longer than the first and second exposure times, respectively, when the brightness of the first and second imaging data is less than the first and second predetermined ranges, respectively, and the third and fourth exposure times are shorter than the first and second exposure times, respectively, when the brightness of the first and second imaging data is more than the first and second predetermined ranges, respectively.

5. An electronic apparatus comprising:

the spectral measurement device according to claim 4; and a controller that controls the spectral measurement device.

* * * * *